United States Patent
Abedini et al.

(10) Patent No.: US 11,343,666 B2
(45) Date of Patent: May 24, 2022

(54) WAVEFORM DESIGN OF DISCOVERY SIGNALS

(71) Applicant: QUALCOMM Incorporated, San Diego, CA (US)

(72) Inventors: Navid Abedini, Somerset, NJ (US); Zhibin Wu, Bedminster, NJ (US); Junyi Li, Chester, NJ (US); Sudhir Kumar Baghel, Hillsborough, NJ (US); Kapil Gulati, Dover, DE (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 16/239,383

(22) Filed: Jan. 3, 2019

(65) Prior Publication Data

US 2019/0253866 A1 Aug. 15, 2019

Related U.S. Application Data

(60) Provisional application No. 62/630,055, filed on Feb. 13, 2018.

(51) Int. Cl.
*H04W 8/00* (2009.01)
*H04W 72/00* (2009.01)
(Continued)

(52) U.S. Cl.
CPC ......... *H04W 8/005* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS 8,750,281 B2 * 6/2014 Shellhammer ...... H04L 27/2613
370/349
9,924,503 B2 * 3/2018 Kim .................... H04L 45/7453
(Continued)

FOREIGN PATENT DOCUMENTS

EP 2028794 A1 2/2009

OTHER PUBLICATIONS

Alcatel-Lucent Shanghai Bell, et al., "Channel Design for D2D Discovery", 3GPP TSG RAN WG1 Meeting #77, 3GPP Draft; R1-142051—Channel Design for D2D Discovery Final, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014, May 18, 2014 (May 18, 2014), 4 Pages, XP050789171, Retrieved from the Internet: URL: http://www.3gpp.org/ftp/Meetings_3GPP_SYNC/RAN1/RAN1/Docs/ [retrieved on May 18, 2014] Sect.s 1-3.
(Continued)

*Primary Examiner* — Ajit Patel
*Assistant Examiner* — Liem H. Nguyen
(74) *Attorney, Agent, or Firm* — Holland & Hart LLP

(57) ABSTRACT

Methods, systems, and devices for wireless communications are described. In some wireless communications systems, a wireless device may broadcast a discovery preamble to identify a receiving device or to identify a suitable beam for communicating with a receiving device prior to broadcasting a discovery message to the receiving device. In such systems, the wireless device may use the techniques described herein to generate the discovery preamble and to reduce interference between discovery preamble transmissions and avoid data loss. In one example, a wireless device may append a cyclic prefix (CP) to a discovery preamble with a suitable length to protect the discovery preamble from interference from another transmission. In another example,
(Continued)

the wireless device may generate a cyclically periodic signal including multiple copies of the discovery preamble so a receiving device may be able to receive a portion of the signal and identify the discovery preamble.

25 Claims, 13 Drawing Sheets

(51) Int. Cl.
    *H04B 7/06*     (2006.01)
    *H04B 7/08*     (2006.01)
    *H04L 5/00*     (2006.01)
    *H04L 27/26*     (2006.01)
    *H04L 27/00*     (2006.01)

(52) U.S. Cl.
    CPC ............ *H04L 5/005* (2013.01); *H04L 5/0037* (2013.01); *H04L 5/0069* (2013.01); *H04L 5/0094* (2013.01); *H04L 27/261* (2013.01); *H04L 27/2607* (2013.01); *H04W 72/005* (2013.01); *H04L 5/0023* (2013.01); *H04L 5/0053* (2013.01); *H04L 5/0073* (2013.01); *H04L 5/0087* (2013.01); *H04L 2027/0095* (2013.01)

(56) References Cited

U.S. PATENT DOCUMENTS

| | | | | |
|---|---|---|---|---|
| 10,142,946 | B2* | 11/2018 | Choi | H04W 52/242 |
| 2006/0239370 | A1* | 10/2006 | Mody | H04L 27/2659 375/260 |
| 2009/0268825 | A1* | 10/2009 | Sakai | H04L 25/03057 375/260 |
| 2010/0265999 | A1* | 10/2010 | Stern | H04L 27/26265 375/219 |
| 2011/0170435 | A1* | 7/2011 | Kim | H04L 1/0693 370/252 |
| 2013/0272435 | A1 | 10/2013 | Shellhammer | |
| 2014/0056220 | A1* | 2/2014 | Poitau | H04W 40/246 370/328 |
| 2014/0301301 | A1* | 10/2014 | Cheng | H04L 5/00 370/329 |
| 2015/0264552 | A1* | 9/2015 | Xiong | H04W 8/005 370/329 |
| 2015/0282132 | A1* | 10/2015 | Kim | H04W 4/08 370/329 |
| 2015/0326373 | A1* | 11/2015 | Ryu | H04L 5/0092 370/330 |
| 2016/0007406 | A1* | 1/2016 | Yi | H04W 76/28 370/252 |
| 2016/0157080 | A1 | 6/2016 | Agiwal et al. | |
| 2016/0157217 | A1* | 6/2016 | Xue | H04L 5/0044 370/330 |
| 2016/0294595 | A1* | 10/2016 | Harada | H04L 27/2646 |
| 2016/0301556 | A1* | 10/2016 | Nory | H04W 72/042 |
| 2016/0373227 | A1* | 12/2016 | Sun | H04L 5/0094 |
| 2017/0070312 | A1* | 3/2017 | Yi | H04J 11/0069 |
| 2018/0097679 | A1* | 4/2018 | Zhang | H04W 72/1268 |
| 2018/0270868 | A1* | 9/2018 | Ou | H04W 72/042 |
| 2019/0081832 | A1* | 3/2019 | Marinier | H04L 5/0053 |
| 2019/0090262 | A1* | 3/2019 | Yan | H04W 72/042 |
| 2019/0090293 | A1* | 3/2019 | Su | H04W 8/005 |
| 2019/0097774 | A1* | 3/2019 | Li | H04L 5/0053 |
| 2019/0215816 | A1* | 7/2019 | Tang | H04L 5/0091 |
| 2020/0008155 | A1* | 1/2020 | Li | H04W 52/146 |
| 2020/0037329 | A1* | 1/2020 | Fu | H04L 27/2607 |
| 2020/0084011 | A1* | 3/2020 | Li | H04L 5/0098 |
| 2020/0154484 | A1* | 5/2020 | Ohara | H04L 27/2626 |
| 2020/0314946 | A1* | 10/2020 | Tsuboi | H04W 24/10 |

OTHER PUBLICATIONS

Alcatel-Lucent Shanghai Bell, et al., "Preamble Design for D2D Discovery", 3GPP TSG RAN WG1 Meeting #77, 3GPP Draft; R1-142052—Preamble Design for D2D Discovery Final, 3rd Generation Partnership Project (3GPP), Mobile Competence Centre, 650, Route Des Lucioles, F-06921 Sophia-Antipolis Cedex, France, vol. RAN WG1, No. Seoul, Korea; May 19, 2014-May 23, 2014, May 18, 2014 (May 18, 2014), 5 Pages, XP050789172, Retrieved from the Internet: URL: http://www.3gpp.org/ftp/Meetings_3GPP_SYNC/RAN1/RAN1/Docs/ [retrieved on May 18, 2014], Sect.s 1, 2, Figures 2, 3.

International Search Report and Written Opinion—PCT/US2019/012393—ISA/EPO—dated Apr. 24, 2019.

LG Electronics: "Discussion on D2D Discovery Physical Layer Design", 3GPP TSG RAN WG1 Meeting #76bis, 3GPP Draft; R1-141738 Discussion on D2D Discovery Physical Layer Design LG, 3rd Generation Partnership Project (3GPP), Mobile Competence Centre; 650, Route Des Lucioles; F-06921 Sophia-Antipolis, CED, vol. RAN WG1, No. Shenzhen, China; Mar. 31, 2014-Apr. 4, 2014, Apr. 3, 2014 (Apr. 3, 2014), pp. 1-10, XP050814124, Retrieved from the Internet: URL: http://www.3gpp.org/ftp/tsg_ran/WG1_RL1/TSGR1_76b/Docs/ [retrieved on Apr. 3, 2014] Sect.s 1, 2, Figures 1, 2.

LG Electronics: "Synchronization for D2D Discovery", 3GPP TSG RAN WG1 Meeting #74, 3GPP Draft; R1-133387 Synchronization for D2D Discovery_LG, 3rd generation partnership project (3GPP), Mobile Competence Centre; 650, Route Des Lucioles; F-06921 Sophia-Antipolis Cedex; France, vol. RAN WG1, No. Barcelona, Spain; Aug. 19, 2013-Aug. 23, 2013, Aug. 10, 2013 (Aug. 10, 2013), pp. 1-12, XP050716501, Retrieved from the Internet: URL: http://www.3gpp.org/ftp/tsg_ran/WG1_RL1/TSGR1_74/Docs/ [retrieved on Aug. 10, 2013] Sect. s 1-3.

ITRI: "Discovery Preamble Design for AGC Consideration in SC-FDM Systems", 3GPP TSG RAN WG1 Meeting #76bis, 3GPP Draft; R1-141479, 3rd Generation Partnership Project (3GPP), Mobile Competence Centre; 650, Route Des Lucioles; F-06921 Sophia-AntiPolls Cedex; France, vol. RAN WG1, No. Shenzhen, China; Mar. 31, 2014-Apr. 4, 2014, Mar. 30, 2014, 8 Pages, XP050787148, Retrieved from the Internet: URL: http://www.3gpp.org/ftp/Meetings_3GPP_SYNC/RAN1/Docs/ [retrieved on Mar. 30, 2014], section 2.2, 8 pages.

\* cited by examiner

WAVEFORM DESIGN OF DISCOVERY SIGNALS

CROSS REFERENCES

The present Application for Patent claims the benefit of U.S. Provisional Patent Application No. 62/630,055 by ABEDINI, et al., entitled "WAVEFORM DESIGN OF DISCOVERY SIGNALS," filed Feb. 13, 2018, assigned to the assignee hereof, and expressly incorporated herein.

BACKGROUND

The following relates to wireless communication and more specifically to waveform design of discovery signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some deployments (e.g., millimeter wave (mmW) deployments and some sub-6 GHz deployments), wireless devices may communicate using beamforming (e.g., directional transmission/reception) to shape or steer an antenna beam (e.g., a transmit beam or receive beam) along a spatial path. By using beamforming, a transmitting device may be able to improve the chances that transmitted signals are received by a receiving device. In some cases, however, time offsets associated with beam-formed transmissions (e.g., positive time offsets (i.e., delays) due to beam switching or propagation and negative time offsets due to synchronization differences between transmitting and receiving devices) may disrupt communications between the transmitting and receiving devices, which may be detrimental to a wireless communications system.

SUMMARY

Some wireless communications systems may support beamforming to improve the reliability of transmissions from a transmitting device to a receiving device. In some cases, a wireless device may broadcast a discovery preamble to identify a receiving device or to identify a suitable beam for communicating with a receiving device prior to broadcasting a discovery message to be received by the receiving device. In such cases, in order to avoid data loss and to reduce interference between discovery preamble transmissions, a wireless device may utilize the techniques described herein to generate discovery preambles. In one example, a wireless device may append a cyclic prefix (CP) to a discovery preamble with a suitable length to protect the discovery preamble from interference from another transmission. In another example, the wireless device may generate a cyclically periodic signal including multiple copies of the discovery preamble such that a receiving device may be able to receive a portion of the signal and identify the discovery preamble.

A method for wireless communication is described. The method may include identifying discovery information to broadcast in a discovery message as part of a device discovery procedure, generating a discovery preamble to transmit prior to the discovery message, where the discovery preamble indicates an upcoming transmission of the discovery message, applying a first CP to the discovery preamble and a second CP to the discovery message, where the first CP is longer than the second CP, and transmitting one or more copies of the generated discovery preamble.

An apparatus for wireless communication is described. The apparatus may include means for identifying discovery information to broadcast in a discovery message as part of a device discovery procedure, means for generating a discovery preamble to transmit prior to the discovery message, where the discovery preamble indicates an upcoming transmission of the discovery message, means for applying a first CP to the discovery preamble and a second CP to the discovery message, where the first CP is longer than the second CP, and means for transmitting one or more copies of the generated discovery preamble.

Another apparatus for wireless communication is described. The apparatus may include a processor, memory in electronic communication with the processor, and instructions stored in the memory. The instructions may be operable to cause the processor to identify discovery information to broadcast in a discovery message as part of a device discovery procedure, generate a discovery preamble to transmit prior to the discovery message, where the discovery preamble indicates an upcoming transmission of the discovery message, apply a first CP to the discovery preamble and a second CP to the discovery message, where the first CP is longer than the second CP, and transmit one or more copies of the generated discovery preamble.

A non-transitory computer-readable medium for wireless communication is described. The non-transitory computer-readable medium may include instructions operable to cause a processor to identify discovery information to broadcast in a discovery message as part of a device discovery procedure, generate a discovery preamble to transmit prior to the discovery message, where the discovery preamble indicates an upcoming transmission of the discovery message, apply a first CP to the discovery preamble and a second CP to the discovery message, where the first CP is longer than the second CP, and transmit one or more copies of the generated discovery preamble.

In some examples of the method, apparatus, and non-transitory computer-readable medium described above, the first CP associated with the discovery preamble includes an extended CP and the second CP associated with the discovery message includes a normal CP. In some examples of the method, apparatus, and non-transitory computer-readable medium described above, generating the discovery preamble includes generating the discovery preamble using a subcarrier spacing that may be less than a subcarrier spacing used for the discovery message. In some examples of the method, apparatus, and non-transitory computer-readable medium described above, the first CP may be longer than a maximum time offset for discovery preamble transmissions.

In some examples of the method, apparatus, and non-transitory computer-readable medium described above, a length of the first CP may be based on a subcarrier spacing used to generate the discovery preamble. In some examples of the method, apparatus, and non-transitory computer-readable medium described above, the subcarrier spacing used to generate the discovery preamble includes a first subcarrier spacing and the first CP includes a normal CP. In some examples of the method, apparatus, and non-transitory computer-readable medium described above, the subcarrier spacing used to generate the discovery preamble includes a second subcarrier spacing and the first CP includes an extended CP.

In some examples of the method, apparatus, and non-transitory computer-readable medium described above, a length of the first CP may be based at least in part on a frequency band in which the one or more copies of the generated discovery preamble may be transmitted. In some examples of the method, apparatus, and non-transitory computer-readable medium described above, the frequency band in which the one or more copies of the generated discovery preamble may be transmitted includes a first frequency band and the first CP includes a normal CP. In some examples of the method, apparatus, and non-transitory computer-readable medium described above, the frequency band in which the one or more copies of the generated discovery preamble may be transmitted includes a second frequency band and the first CP includes an extended CP.

A method for wireless communication is described. The method may include receiving a broadcast of a discovery preamble as part of a device discovery procedure, where the discovery preamble indicates an upcoming transmission of a discovery message, and where a first CP associated with the discovery preamble is longer than a second CP associated with the discovery message and receiving the discovery message based on receiving the broadcast of the discovery preamble.

An apparatus for wireless communication is described. The apparatus may include means for receiving a broadcast of a discovery preamble as part of a device discovery procedure, where the discovery preamble indicates an upcoming transmission of a discovery message, and where a first CP associated with the discovery preamble is longer than a second CP associated with the discovery message and means for receiving the discovery message based on receiving the broadcast of the discovery preamble.

Another apparatus for wireless communication is described. The apparatus may include a processor, memory in electronic communication with the processor, and instructions stored in the memory. The instructions may be operable to cause the processor to receive a broadcast of a discovery preamble as part of a device discovery procedure, where the discovery preamble indicates an upcoming transmission of a discovery message, and where a first CP associated with the discovery preamble is longer than a second CP associated with the discovery message and receive the discovery message based on receiving the broadcast of the discovery preamble.

A non-transitory computer-readable medium for wireless communication is described. The non-transitory computer-readable medium may include instructions operable to cause a processor to receive a broadcast of a discovery preamble as part of a device discovery procedure, where the discovery preamble indicates an upcoming transmission of a discovery message, and where a first CP associated with the discovery preamble is longer than a second CP associated with the discovery message and receive the discovery message based on receiving the broadcast of the discovery preamble.

In some examples of the method, apparatus, and non-transitory computer-readable medium described above, the first CP associated with the discovery preamble includes an extended CP and the second CP associated with the discovery message includes a normal CP. In some examples of the method, apparatus, and non-transitory computer-readable medium described above, the discovery preamble may be generated using a subcarrier spacing that may be less than a subcarrier spacing used for the discovery message. In some examples of the method, apparatus, and non-transitory computer-readable medium described above, the first CP may be longer than a maximum time offset for discovery preamble transmissions.

In some examples of the method, apparatus, and non-transitory computer-readable medium described above, a length of the first CP may be based on a subcarrier spacing used to generate the discovery preamble. In some examples of the method, apparatus, and non-transitory computer-readable medium described above, the subcarrier spacing used to generate the discovery preamble includes a first subcarrier spacing and the first CP includes a normal CP. In some examples of the method, apparatus, and non-transitory computer-readable medium described above, the subcarrier spacing used to generate the discovery preamble includes a second subcarrier spacing and the first CP includes an extended CP.

In some examples of the method, apparatus, and non-transitory computer-readable medium described above, a length of the first CP may be based at least in part on a frequency band in which the discovery preamble may be received. In some examples of the method, apparatus, and non-transitory computer-readable medium described above, the frequency band in which the discovery preamble may be received includes a first frequency band and the first CP includes a normal CP. In some examples of the method, apparatus, and non-transitory computer-readable medium described above, the frequency band in which the discovery preamble may be received includes a second frequency band and the first CP includes an extended CP.

A method for wireless communication is described. The method may include identifying discovery information to broadcast in a discovery message as part of a device discovery procedure, generating a cyclically periodic signal including a plurality of copies of a discovery preamble to transmit prior to the discovery message, where the discovery preamble indicates an upcoming transmission of the discovery message, and transmitting the cyclically periodic signal including the plurality of copies of the discovery preamble.

An apparatus for wireless communication is described. The apparatus may include means for identifying discovery information to broadcast in a discovery message as part of a device discovery procedure, means for generating a cyclically periodic signal including a plurality of copies of a discovery preamble to transmit prior to the discovery message, where the discovery preamble indicates an upcoming transmission of the discovery message, and means for transmitting the cyclically periodic signal including the plurality of copies of the discovery preamble.

Another apparatus for wireless communication is described. The apparatus may include a processor, memory in electronic communication with the processor, and instructions stored in the memory. The instructions may be operable to cause the processor to identify discovery information to broadcast in a discovery message as part of a device discovery procedure, generate a cyclically periodic signal including a plurality of copies of a discovery preamble to transmit prior to the discovery message, where the discovery preamble indicates an upcoming transmission of the discovery message, and transmit the cyclically periodic signal including the plurality of copies of the discovery preamble.

A non-transitory computer-readable medium for wireless communication is described. The non-transitory computer-readable medium may include instructions operable to cause a processor to identify discovery information to broadcast in a discovery message as part of a device discovery procedure, generate a cyclically periodic signal including a plurality of copies of a discovery preamble to transmit prior to the discovery message, where the discovery preamble indicates an upcoming transmission of the discovery message, and transmit the cyclically periodic signal including the plurality of copies of the discovery preamble.

In some examples of the method, apparatus, and non-transitory computer-readable medium described above, generating the cyclically periodic signal includes identifying a base sequence corresponding to the discovery preamble, determining a subcarrier spacing for mapping the base sequence to subcarriers in a frequency domain, mapping the base sequence to non-consecutive subcarriers in the frequency domain based on the subcarrier spacing, where a number of subcarriers between the non-consecutive subcarriers corresponds to a number of copies of the discovery preamble included in the cyclically periodic signal, generating a time domain waveform including the plurality of copies of the discovery preamble based on a frequency-to-time-domain transform of the mapped base sequence, and appending a CP to the time domain waveform to generate the cyclically periodic signal including the plurality of copies of the discovery preamble.

In some examples of the method, apparatus, and non-transitory computer-readable medium described above, generating the cyclically periodic signal includes generating a plurality of time domain waveforms each including a copy of the discovery preamble, cyclically shifting at least one of the plurality of time domain waveforms based on a length of a CP to be appended to the at least one time domain waveform and a position of the at least one time domain waveform in the cyclically periodic signal, appending a CP to each time domain waveform of the plurality of time domain waveforms, and combining the plurality of time domain waveforms to generate the cyclically periodic signal.

A method for wireless communication is described. The method may include receiving at least a portion of a cyclically periodic signal including a plurality of copies of a discovery preamble, where the discovery preamble indicates an upcoming transmission of a discovery message and receiving the discovery message based on receiving at least the portion of the cyclically periodic signal.

An apparatus for wireless communication is described. The apparatus may include means for receiving at least a portion of a cyclically periodic signal including a plurality of copies of a discovery preamble, where the discovery preamble indicates an upcoming transmission of a discovery message and means for receiving the discovery message based on receiving at least the portion of the cyclically periodic signal.

Another apparatus for wireless communication is described. The apparatus may include a processor, memory in electronic communication with the processor, and instructions stored in the memory. The instructions may be operable to cause the processor to receive at least a portion of a cyclically periodic signal including a plurality of copies of a discovery preamble, where the discovery preamble indicates an upcoming transmission of a discovery message and receive the discovery message based on receiving at least the portion of the cyclically periodic signal.

A non-transitory computer-readable medium for wireless communication is described. The non-transitory computer-readable medium may include instructions operable to cause a processor to receive at least a portion of a cyclically periodic signal including a plurality of copies of a discovery preamble, where the discovery preamble indicates an upcoming transmission of a discovery message and receive the discovery message based on receiving at least the portion of the cyclically periodic signal.

Some examples of the method, apparatus, and non-transitory computer-readable medium described above may include processes, features, means, or instructions for cyclically shifting the received portion of the cyclically periodic signal to identify the discovery preamble. In some examples of the method, apparatus, and non-transitory computer-readable medium described above, the cyclically periodic signal includes a CP appended to a time domain waveform including the plurality of copies of the discovery preamble. In some examples of the method, apparatus, and non-transitory computer-readable medium described above, the cyclically periodic signal includes a combination of time domain waveforms each corresponding to a different copy of the discovery preamble and each including an appended CP.

DETAILED DESCRIPTION

Figure 1:
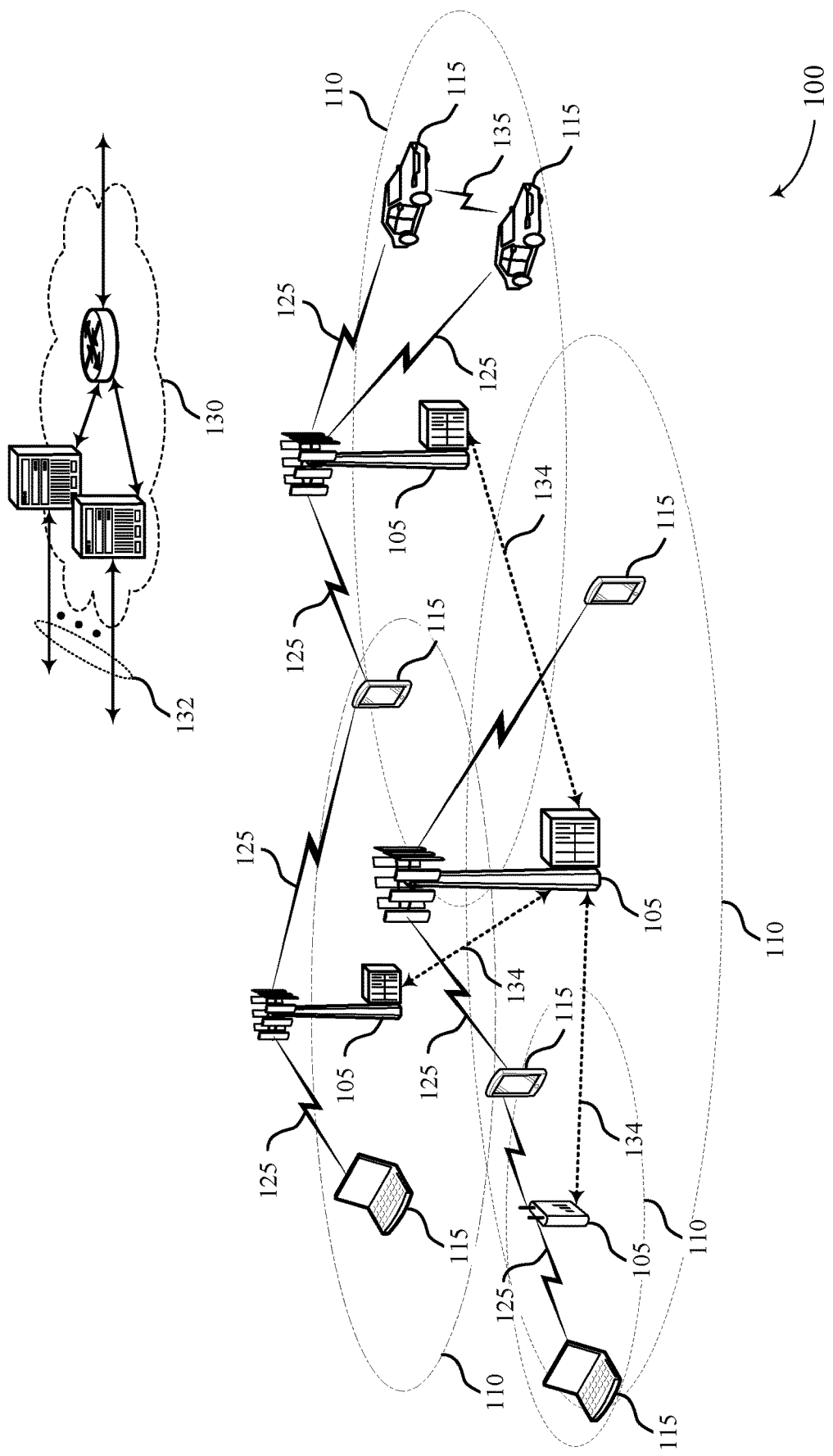
FIGS. 1 and 2 illustrate examples of wireless communications systems that support waveform design of discovery signals in accordance with aspects of the present disclosure.

Some wireless communications systems may support beamforming to improve the reliability of transmissions from a transmitting device to a receiving device (e.g., in millimeter wave (mmW) deployments). In such systems, a transmitting device may use multiple antennas or antenna arrays to conduct beamforming operations for directional communications with a receiving device. In some cases, it may be appropriate for a transmitting device to utilize beamforming to broadcast a large amount of data (e.g., in a discovery message) to one or more receiving devices. In such aspects, the transmitting device may broadcast a discovery preamble to first identify a receiving device or identify a suitable beam for communicating with a receiving device prior to broadcasting the large amount of data (e.g., in the discovery message) to be received by the receiving device.

In some cases, transmission and reception of discovery preambles may be offset in time (e.g., delayed) due to several factors, resulting in interference (e.g., inter-symbol interference) between discovery preamble transmissions in a wireless communications system. For example, the propagation delay associated with a discovery preamble transmission may result in interference between the discovery preamble transmission and another discovery preamble transmission, and, as a result, some of the data in a discovery preamble may be lost. In order to prevent data loss (e.g., due to interference), it may be appropriate for a transmitting device to append a cyclic prefix (CP) to a discovery preamble to provide a guard period between discovery preamble transmissions. However, due to the number of factors contributing to the time offset of a discovery preamble transmission and the potential for the time offset to vary across different discovery preamble transmissions, it may be challenging to identify an appropriate CP duration for discovery preamble transmissions in a wireless communications system.

As described herein, a wireless device may support techniques for generating a discovery preamble to limit data loss in a wireless communications system. In one aspect, the wireless device may apply a CP to a discovery preamble with a duration that is longer than a maximum time offset associated with discovery preamble transmissions (e.g., longer than a CP applied to a discovery message or another message). For example, the wireless device may apply an extended CP to the discovery preamble. Alternatively, the wireless device may generate the discovery preamble using a shorter subcarrier spacing than a discovery message or another message such that the CP applied to the discovery preamble may be longer than the CP appended to the discovery message or the other message. In another aspect, the wireless device may generate a cyclically periodic signal including multiple copies of a discovery preamble, such that a receiving device may be able to identify the discovery preamble in any portion of the cyclically periodic signal (i.e., regardless of delays or other time offsets).

Aspects of the disclosure introduced above are described below in the context of a wireless communications system. Examples of processes and signaling exchanges that support a waveform design of discovery signals as discussed herein are then described. Aspects of the disclosure are illustrated by and described with reference to apparatus diagrams, system diagrams, and flowcharts that relate to a waveform design of discovery signals as discussed herein.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Wireless communications system 100 may support direct communication between UEs 115 over a sidelink 135 (e.g., using a peer-to-peer (P2P) or device-to-device (D2D) protocol). Sidelink communication (e.g., communication over a sidelink 135) may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, the numerology employed within a system (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal CP in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

Wireless communications system 100 may operate in an extremely-high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super-high frequency (SHF) or UHF transmissions. Techniques disclosed herein may be employed across transmissions that use one or more different frequency regions, and designated use of bands across these frequency regions may differ by country or regulating body.

Beamforming, which may also be referred to as spatial filtering, directional transmission, or directional reception, is a signal processing technique that may be used at a transmitting device or a receiving device in wireless communications system 100 (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device.

Wireless communications system 100 may support beamforming to, for example, overcome the large path loss associated with communications at higher frequencies (e.g., in mmW deployments). A transmitting device in wireless communications system 100 may use multiple antennas or antenna arrays to conduct beamforming operations for directional communications with a receiving device. In some cases, it may be appropriate for a transmitting device to utilize beamforming to broadcast a large amount of data (e.g., in a discovery message) to one or more receiving devices. In such aspects, the transmitting device may broadcast a discovery preamble to first identify a receiving device or identify a suitable beam for communicating with a receiving device prior to broadcasting the large amount of data (e.g., in the discovery message) to be received by the receiving device. The receiving device may receive the discovery preamble and acquire synchronization information (e.g., finer synchronization compared to synchronization with an external device) from the discovery preamble for communications with the receiving device (e.g., to receive the discovery message).

In some cases, transmission and reception of the discovery preamble may be offset in time due to one or more factors, resulting in, for example, interference between discovery preamble transmissions. In one aspect, the timing of transmitting and receiving devices may not be identically synchronized (i.e., there may be some residual offset) with an external source (e.g., a base station or a global positioning system (GPS)) or may otherwise be inaccurate. For instance, if the timing of the device is based on a GPS, the timing of the device may be accurate within 12 Ts of the GPS timing, where Ts=1/(sampling period per symbol*subcarrier spacing). As a result, a receiving device may attempt to receive a discovery preamble early or late and some of the data in the discovery preamble may be lost. In another aspect, during a beam sweeping procedure, a transmitting or receiving device may transmit or receive multiple discovery preambles using different beams, and the delay associated with changing beams (e.g., over consecutive symbols) may result in a delayed transmission or reception and some of the data in the discovery preamble may be lost. In another aspect, the propagation delay associated with a discovery preamble transmission may result in interference between discovery preamble transmissions and some of the data in the discovery preamble may be lost.

In order to prevent data loss due to the factors mentioned above, it may be appropriate for a transmitting device to append a CP to a discovery preamble to provide a guard period between discovery preamble transmissions. However, due to the number of factors contributing to the time offset of transmission and reception of discovery preambles and the potential for the time offset to vary across different discovery preamble transmissions, it may be challenging to identify an appropriate CP duration for discovery preamble transmissions in a wireless communications system. Wireless communications system 100 may support techniques for generating a discovery preamble to limit interference and data loss associated with discovery preamble transmissions.

Figure 2:
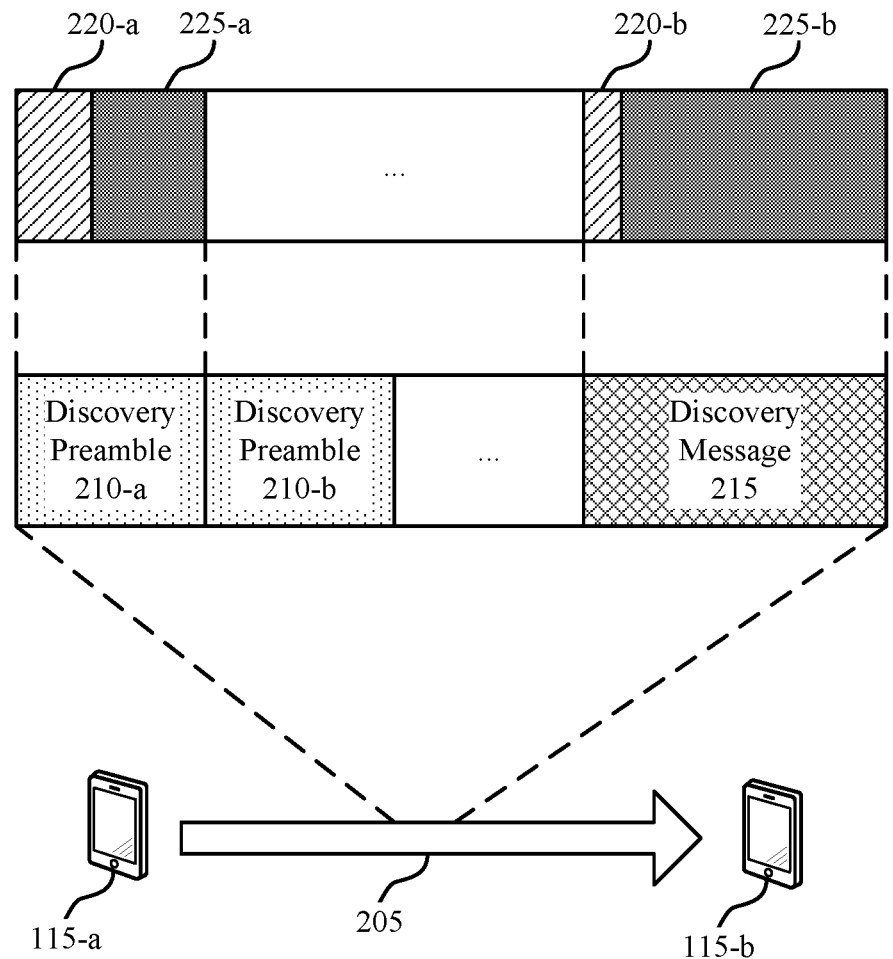

FIG. 2 illustrates an example of a wireless communications system 200 that supports a waveform design of discovery signals in accordance with various aspects of the present disclosure. Wireless communications system 200 includes UE 115-*a* and UE 115-*b*, which may be examples of a UE 115 described with reference to FIG. 1. UE 115-*a* may communicate with UE 115-*b* on resources of a carrier 205. Although FIG. 2 illustrates communications between a UE 115-*a* and a UE 115-*b* (e.g., for discovery signaling in a device-discovery procedure for V2X communications), it is to be understood that the techniques described herein may be applicable to communications between a base station and a UE (e.g., for discovery signaling in an initial access procedure) or between two base stations (e.g., for discovery signaling in a backhaul network).

Wireless communications system 200 may implement aspects of wireless communications system 100. For example, UEs 115 in wireless communications system 200 may support techniques for generating a discovery preamble 210 to limit interference and data loss associated with discovery preamble transmissions. In particular, UE 115 may generate a discovery preamble 210 with a CP 220-*a* having a duration longer than a maximum time offset associated with discovery preamble transmissions. The maximum time offset may be based on synchronization offsets, beam switching delays, propagation delays, etc. Because the duration of CP 220-*a* may be greater than the maximum time offset, discovery preamble transmissions between UE 115-*a* and UE 115-*b* may not interfere with each other, and no data may be lost in the discovery preamble transmissions. UE 115-*b* may therefore be able to receive the discovery preamble 210 and use the discovery preamble 210 to acquire synchronization information and perform beam training for communications with UE 115-*a* (e.g., for receiving discovery message 215).

UE 115-*a* may generate a discovery preamble 210 with a CP 220 having a duration longer than a maximum time offset using the techniques described herein. In one aspect, UE 115-*a* may generate and append a CP 220-*a* having an appropriate duration (e.g., greater than the maximum time offset) to discovery information 225-*a* to generate the discovery preamble 210. In some examples, CP 220-*a* of the discovery preamble 210 may have a duration greater than the CP 220-*b* of the discovery message 215. In other examples, the CP 220-*a* of the discovery preamble 210 may have a duration greater than a CP of another message (e.g., a data or control message transmitted on carrier 205 in wireless communications system 200).

In another aspect, UE 115-*a* may generate the discovery preamble 210 using a particular subcarrier spacing such that CP 220-*a* is of suitable length. In some examples, discovery preamble 210 may be generated using a smaller subcarrier spacing (e.g., 60 kHz) than a discovery message 215 (e.g., 240 kHz), such that the CP 220-*a* of discovery preamble 210 is longer than the CP 220-*b* of discovery message 215 (i.e., since the symbol duration used to transmit the discovery preamble 210 may be longer than the symbol duration used to transmit the discovery message 215). In other examples, the discovery preamble 210 may be generated using a smaller subcarrier spacing than another message (e.g., a data or control message transmitted on carrier 205 in wireless communications system 200), such that the CP 220-*a* of discovery preamble 210 is longer than the CP of the other message.

In another aspect, UE 115-*a* may determine a duration of a CP 220-*a* to apply to discovery preamble 210 based on configurations used to generate or transmit the discovery preamble 210. In some examples, the duration of the CP 220-*a* may correspond to a subcarrier spacing used to generate the discovery preamble 210. For instance, a normal CP 220-*a* may be applied to discovery preamble 210 if a first subcarrier spacing (e.g., 60 kHz) is used to generate the discovery preamble, and an extended CP 220-*a* may be applied to discovery preamble 210 if a second subcarrier spacing (e.g., 240 kHz) is used to generate the discovery preamble 210. In some cases, it may be appropriate to generate the discovery preamble using a large subcarrier spacing (e.g., 240 GHz) to reduce the overhead associated with the transmission of the discovery preamble. In other examples, the duration of the CP 220-*a* may correspond to a frequency band in which the discovery preamble 210 is being transmitted. For instance, a normal CP 220-a may be applied to discovery preamble 210 if the discovery preamble 210 is being transmitted in a first frequency band (e.g., a sub-6 GHz band), and an extended CP 220-a may be applied to discovery preamble 210 if the discovery preamble 210 is being transmitted in a second frequency band (e.g., an above-6 GHz band).

The above techniques may be used to generate a CP 220 with an appropriate duration to apply to a discovery preamble 210 to provide a guard period between discovery preamble transmissions. Accordingly, discovery preamble transmissions in wireless communications system may not interfere and no data may be lost in a discovery preamble transmission. In some cases, however, if multiple discovery preambles are being transmitted in a transmission burst (e.g., to facilitate beam training), it may be wasteful to apply a large CP to each discovery preamble. Since different devices may have different capabilities (e.g., GPS accuracy, beam switching speeds, etc.) and may implement different algorithms (e.g., beam sweeping algorithms for which a device may or may not perform beam switching in a beam sweeping procedure), it may be wasteful to apply the same CP for discovery preamble transmissions from different devices (e.g., devices prone to different delays or other time offsets). Example techniques for generating a signal with limited CP overhead including multiple copies of a discovery preamble are described with reference to FIGS. 3 and 4.

Figure 3:
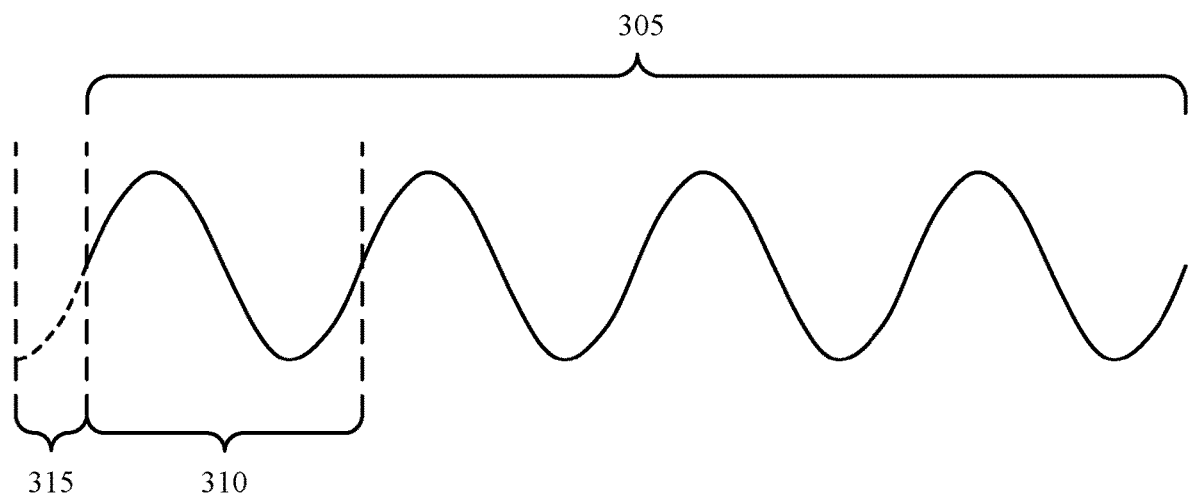
FIGS. 3 and 4 illustrate cyclically periodic signals including multiple copies of a discovery preamble in accordance with aspects of the present disclosure.
Figure 4:
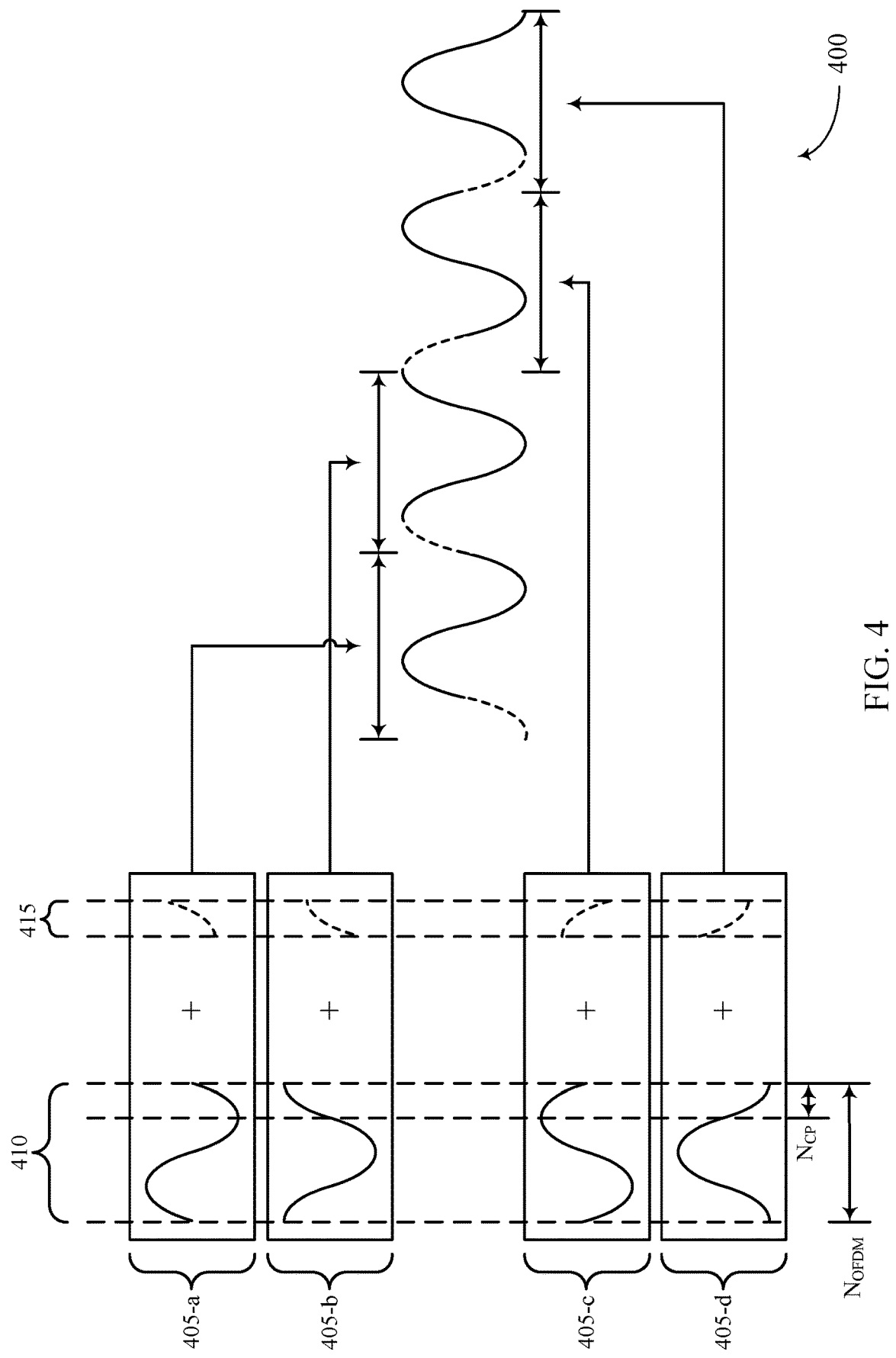

FIGS. 3 and 4 illustrate examples of cyclically periodic signals each including multiple copies of a discovery preamble with limited CP overhead that may be broadcast in a wireless communications system. In these examples, because a receiving UE 115 may identify a copy of a discovery preamble in the signal at any time due to the cyclically-periodic nature of the signal, discovery preamble transmissions may not be affected by delays or other time offsets (e.g., synchronization offsets, propagation delays, beam switching delays, etc.). That is, the receiving UE 115 may be able to identify a discovery preamble in the cyclically periodic signal based on receiving a portion of the cyclically periodic signal and cyclically shifting the portion of the cyclically periodic signal.

In the example of FIG. 3, a transmitting UE 115 (e.g., UE 115-a) may generate the cyclically periodic signal 300 by generating a time domain waveform 305 including multiple copies of a discovery preamble 310 and appending a CP 315 to the time domain waveform 305. In order to generate the time domain waveform 305 including the multiple copies of the discovery preamble 310, the transmitting UE 115 may first identify a base sequence of the discovery preamble 310 of length 'N' (e.g., a Zadoff-Chu (ZC) sequence of length 'N'). The transmitting UE 115 may then map the base sequence to subcarriers in the frequency domain based on a subcarrier spacing. For instance, the UE 115 may map the base sequence to subcarriers in the frequency domain such that 1 out of K consecutive subcarriers is occupied by a value in the base sequence, where K corresponds to a number of copies of the discovery preamble to be included in the cyclically periodic signal 300. The remaining subcarriers may be transmitted with zero power.

In some cases, the spacing 'S' between subcarriers carrying a value in the base sequence may be equal to the subcarrier spacing*K (i.e., S=subcarrier spacing*K). That is, the subcarrier spacing for the transmission of the cyclically periodic signal 300 may be determined based on dividing the bandwidth 'S' by the number of copies 'K' of the discovery preamble to be included in the cyclically periodic signal 300.

Thus, the cyclically periodic signal 300 may span N*K subcarriers, and the bandwidth occupied by the discovery preamble 310 may be N*S Hz. Once the transmitting UE 115 maps the base sequence in the frequency domain, the transmitting UE 115 may perform a frequency-to-time domain transform on the mapped base sequence to generate time domain waveform 305 including the multiple copies of the discovery preamble 310. The generated time domain waveform 305 may include K copies of the discovery preamble 310. The transmitting UE 115 may then append a CP 315 to the time domain waveform 305 to generate the cyclically periodic signal 300.

As an example, the transmitting UE 115 may identify a discovery preamble with a base sequence of length 63 to be broadcast in a wireless communications system. The transmitting UE may then map the base sequence of length 63 to a set of subcarriers in the frequency domain based on a subcarrier spacing of 60 kHz. In particular, the transmitting UE 115 may map the base sequence of length 63 to subcarriers in the frequency domain such that 1 out of 4 (i.e., K=4) consecutive subcarriers is occupied by a value in the base sequence. Thus, each value in the base sequence may be mapped to a 240 kHz bandwidth (i.e., S=subcarrier spacing*K=60 kHz*4=240 kHz), and the entire base sequence may be mapped to a bandwidth of 15.12 MHz (i.e., bandwidth=63*240 kHz). The transmitting UE 115 may then perform a frequency-to-time domain transform to generate time domain waveform 305 including the 4 copies of the discovery preamble 310, and transmitting UE 115 may append a CP 315 to the time domain waveform 305 to generate the cyclically periodic signal 300.

In the example of FIG. 4, a transmitting UE 115 (e.g., UE 115-a) may generate the cyclically periodic signal 400 by combining multiple time domain waveforms 405 each corresponding to a different copy of a discovery preamble 410 and each including an appended CP 415. In order to generate each time domain waveform 405 corresponding to a particular copy of the discovery preamble 410, the transmitting UE 115 may first identify a base sequence of the discovery preamble 410 of length 'N' (e.g., a Zadoff-Chu (ZC) sequence of length 'N'). The transmitting UE 115 may then map the base sequence to subcarriers in the frequency domain based on a subcarrier spacing (e.g., 240 kHz), and the transmitting UE 115 may perform a frequency-to-time domain transform to generate a time domain discovery preamble signal 410 for each copy of the discovery preamble 410. For instance, the transmitting UE may perform an orthogonal frequency division multiplexing (OFDM) inverse fast Fourier transform (IFFT) to convert the mapped base sequence to a time domain signal with N_OFDM samples (e.g., N_OFDM=128) for each copy of the discovery preamble 410.

Once the transmitting device transforms the mapped base sequence to a time domain discovery preamble signal 410 for each copy of a discovery preamble 410 (e.g., each of the K copies of the discovery preamble), the transmitting UE 115 may cyclically shift at least one of the time domain discovery preamble signals 410. The cyclic shifting may be based on a position of a time domain discovery preamble signal in the cyclically periodic signal 400. For instance, each time domain discovery preamble signal 410 (e.g., the kth time domain discovery preamble signal) may be a cyclically shifted version of a previous time domain discovery preamble signal 410 (e.g., the (k-1)st time domain discovery preamble signal). In addition, the cyclic shifting may be performed such that the resulting combination of time domain waveforms 405 is a cyclically periodic signal

400. For example, the cyclic shifting may be based on the length of the CP 415 to be appended to each time domain discovery preamble signal 410 (i.e., a number of CP samples 'N_CP'). In some examples, each time domain discovery preamble signal 410 may be shifted by 'd' samples, where 'd' is calculated using Equation 1 below:

$$d = N\_OFDM - N\_CP \quad (1)$$

After cyclically shifting at least one of the time domain discovery preamble signals, the transmitting UE 115 may append a corresponding CP 415 (e.g., N_CP=9) to each time domain discovery preamble signal 410 to generate the corresponding time domain waveform 405. The transmitting UE 115 may then combine the multiple time domain waveforms 405 to generate the cyclically periodic signal 400 (as illustrated).

In both examples described above (i.e., with reference to FIGS. 3 and 4), a receiving device may receive the cyclically periodic signal and identify a copy of a discovery preamble in the cyclically periodic signal (e.g., in a portion of the cyclically periodic signal). In the example of FIG. 3, since the CP 315 may be appended to the time domain waveform 305 including the multiple copies of the discovery preamble 310 (i.e., as opposed to the CP being appended to each copy of the discovery preamble in the signal), the CP overhead in the cyclically periodic signal 300 may be minimal. As shown in the example of FIG. 4, since the CP 415 appended to each time domain discovery preamble signal is relatively short (e.g., compared to appending a CP greater than a maximum time offset to each discovery preamble in a transmission burst), the CP overhead in cyclically periodic signal 400 is minimal.

Figure 5:
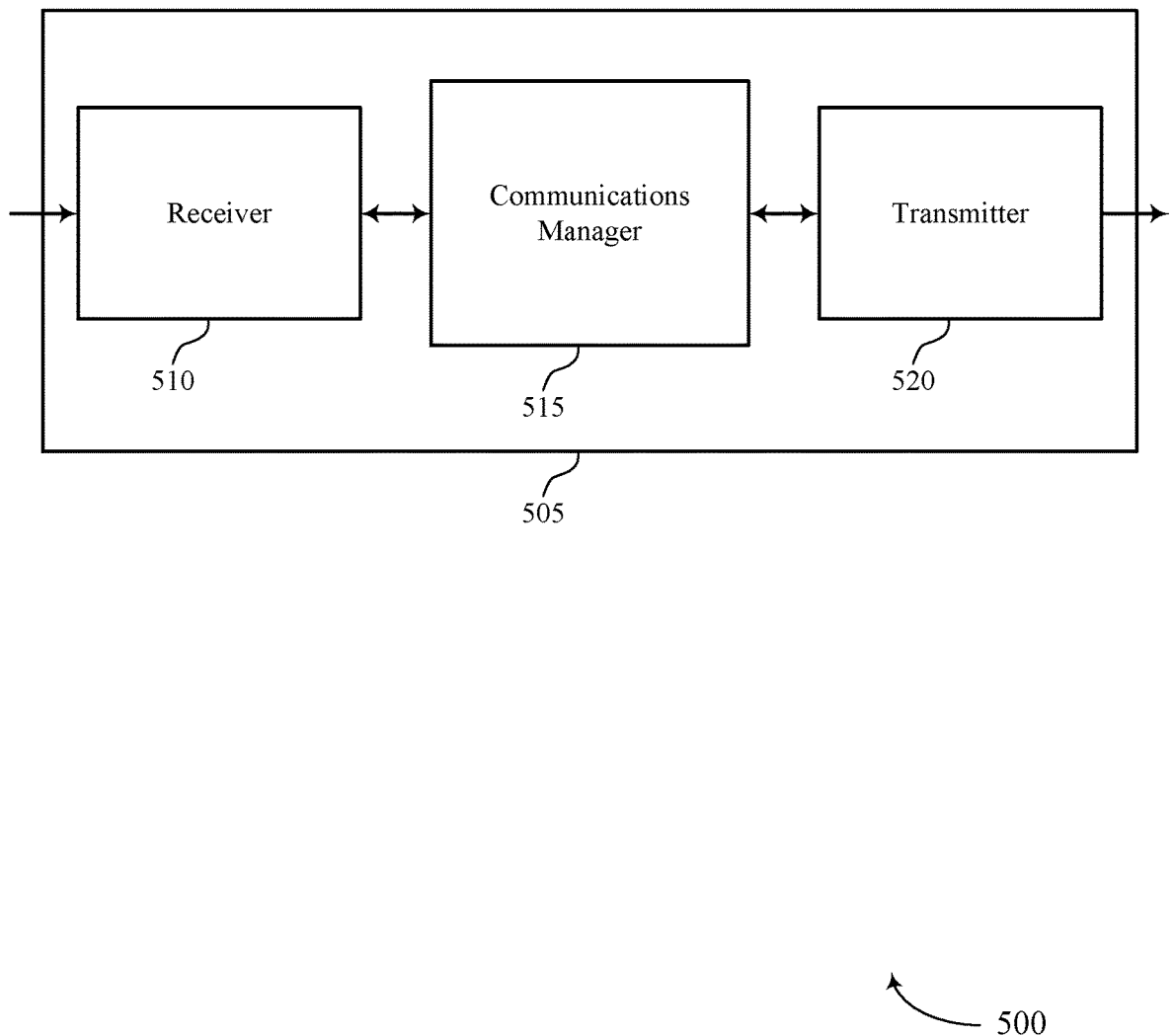
FIGS. 5 through 7 show block diagrams of a device that supports waveform design of discovery signals in accordance with aspects of the present disclosure.

FIG. 5 shows a block diagram 500 of a wireless device 505 that supports waveform design of discovery signals in accordance with aspects of the present disclosure. Wireless device 505 may be an example of aspects of a UE 115 or base station 105 as described herein. Wireless device 505 may include receiver 510, communications manager 515, and transmitter 520. Wireless device 505 may include a processor. Each of these components may be in communication with one another (e.g., via one or more buses).

Receiver 510 may receive information such as packets, user data, or control information associated with various information channels (e.g., control channels, data channels, and information related to waveform design of discovery signals, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may identify discovery information to broadcast in a discovery message as part of a device discovery procedure, generate a discovery preamble to transmit prior to the discovery message, where the discovery preamble indicates an upcoming transmission of the discovery message, apply a first cyclic prefix to the discovery preamble and a second cyclic prefix to the discovery message, where the first cyclic prefix is longer than the second cyclic prefix, and transmit one or more copies of the generated discovery preamble.

The communications manager 515 may receive a broadcast of a discovery preamble as part of a device discovery procedure, where the discovery preamble indicates an upcoming transmission of a discovery message, and where a first cyclic prefix associated with the discovery preamble is longer than a second cyclic prefix associated with the discovery message and receive the discovery message based on receiving the broadcast of the discovery preamble.

The communications manager 515 may identify discovery information to broadcast in a discovery message as part of a device discovery procedure, generate a cyclically periodic signal including a set of copies of a discovery preamble to transmit prior to the discovery message, where the discovery preamble indicates an upcoming transmission of the discovery message, and transmit the cyclically periodic signal including the set of copies of the discovery preamble.

The communications manager 515 may receive at least a portion of a cyclically periodic signal including a set of copies of a discovery preamble, where the discovery preamble indicates an upcoming transmission of a discovery message and receive the discovery message based on receiving at least the portion of the cyclically periodic signal.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
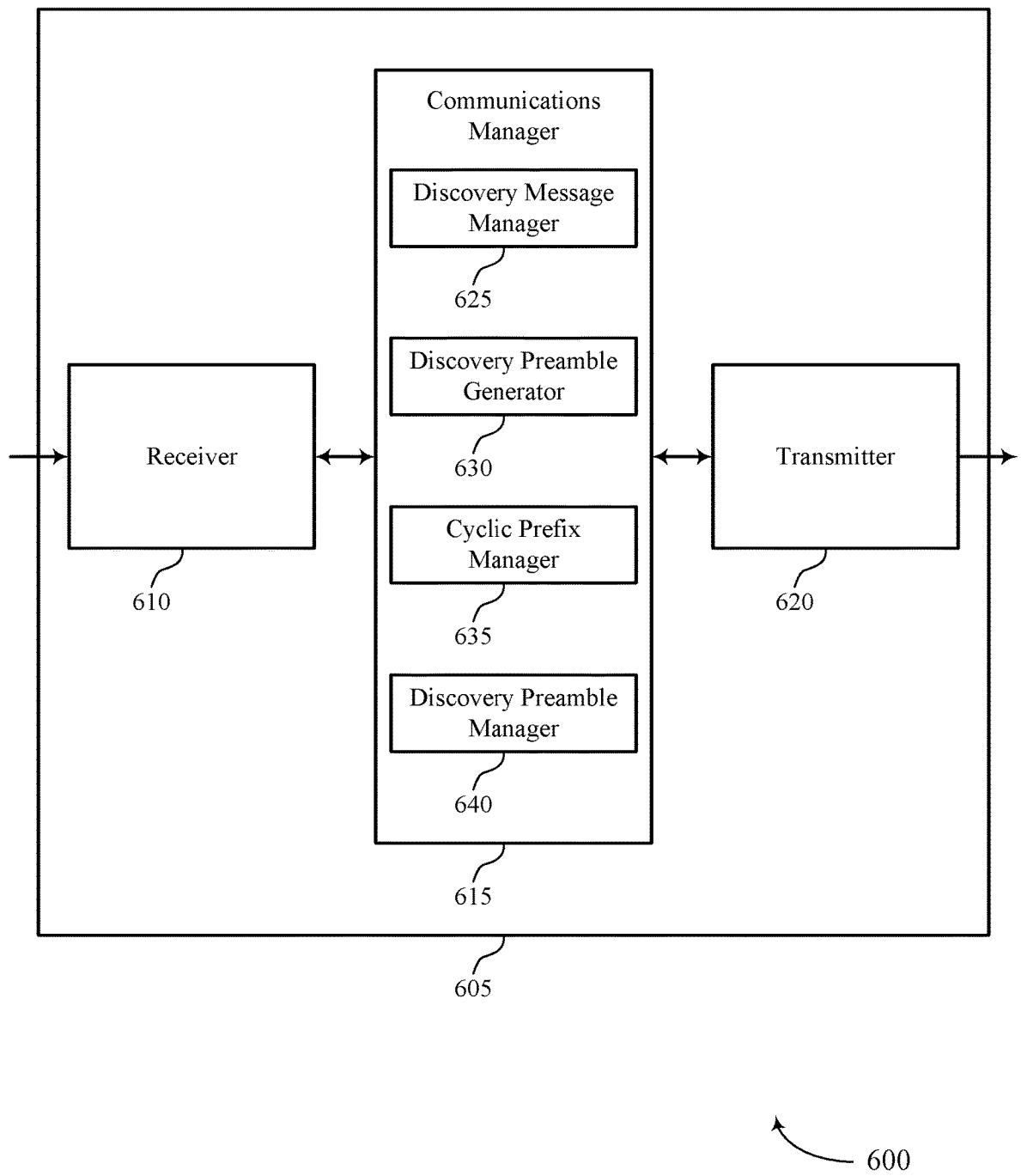

FIG. 6 shows a block diagram 600 of a wireless device 605 that supports waveform design of discovery signals in accordance with aspects of the present disclosure. Wireless device 605 may be an example of aspects of a wireless device 505 or a UE 115 or base station 105 as described with reference to FIG. 5. Wireless device 605 may include receiver 610, communications manager 615, and transmitter 620. Wireless device 605 may include a processor. Each of these components may be in communication with one another (e.g., via one or more buses).

Receiver 610 may receive information such as packets, user data, or control information associated with various information channels (e.g., control channels, data channels, and information related to waveform design of discovery signals, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may include discovery message manager 625, discovery preamble generator 630, cyclic prefix manager 635, and discovery preamble manager 640.

Discovery message manager 625 may identify discovery information to broadcast in a discovery message as part of a device discovery procedure. Discovery preamble generator 630 may generate a discovery preamble to transmit prior to the discovery message, where the discovery preamble indicates an upcoming transmission of the discovery message. Cyclic prefix manager 635 may then apply a first cyclic prefix to the discovery preamble and a second cyclic prefix to the discovery message, where the first cyclic prefix is longer than the second cyclic prefix. Transmitter 620 may then transmit one or more copies of the generated discovery preamble.

Discovery preamble manager 640 may receive a broadcast of a discovery preamble as part of a device discovery procedure, where the discovery preamble indicates an upcoming transmission of a discovery message, and where a first cyclic prefix associated with the discovery preamble is longer than a second cyclic prefix associated with the discovery message. Discovery message manager 625 may then receive the discovery message based on receiving the broadcast of the discovery preamble.

Discovery message manager 625 may identify discovery information to broadcast in a discovery message as part of a device discovery procedure. Discovery preamble manager 640 may generate a cyclically periodic signal including a set of copies of a discovery preamble to transmit prior to the discovery message, where the discovery preamble indicates an upcoming transmission of the discovery message. Transmitter 620 may then transmit the cyclically periodic signal including the set of copies of the discovery preamble.

Discovery preamble manager 640 may receive at least a portion of a cyclically periodic signal including a set of copies of a discovery preamble, where the discovery preamble indicates an upcoming transmission of a discovery message. Discovery message manager 625 may receive the discovery message based on receiving at least the portion of the cyclically periodic signal.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
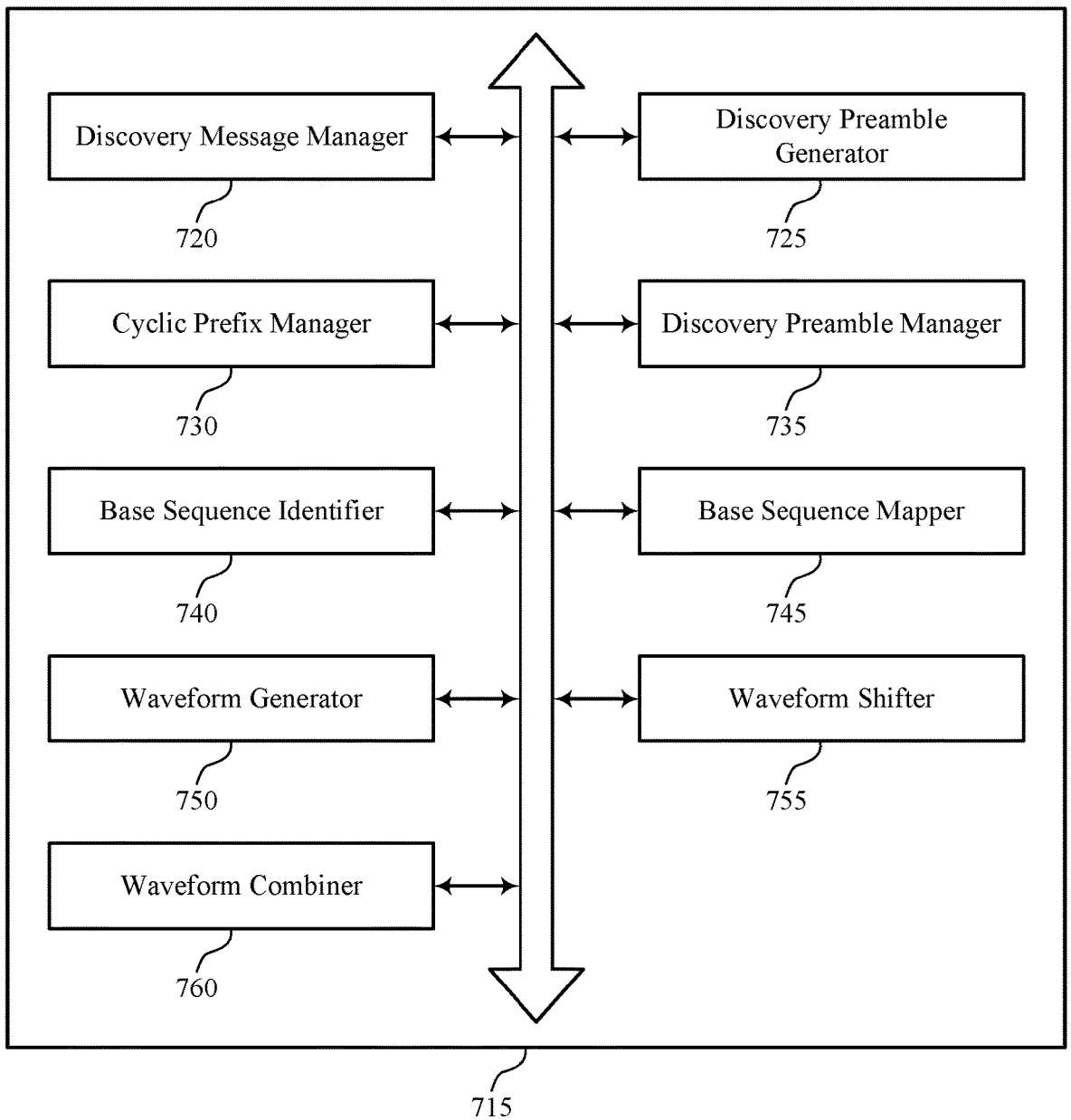

FIG. 7 shows a block diagram 700 of a communications manager 715 that supports waveform design of discovery signals in accordance with aspects of the present disclosure. The communications manager 715 may be an example of aspects of a communications manager 515, a communications manager 615, or a communications manager 815 described with reference to FIGS. 5, 6, and 8. The communications manager 715 may include discovery message manager 720, discovery preamble generator 725, cyclic prefix manager 730, discovery preamble manager 735, base sequence identifier 740, base sequence mapper 745, waveform generator 750, waveform shifter 755, and waveform combiner 760. Each of these modules may communicate, directly or indirectly, with one another (e.g., via one or more buses).

Discovery message manager 720 may identify discovery information to broadcast in a discovery message as part of a device discovery procedure. Discovery message manager 720 may receive the discovery message based on receiving the broadcast of the discovery preamble. In some cases, the first cyclic prefix is longer than a maximum time offset for discovery preamble transmissions. In other cases, a length of the first cyclic prefix is based on a subcarrier spacing used to generate the discovery preamble. In such cases, the subcarrier spacing used to generate the discovery preamble may include a first subcarrier spacing and the first cyclic prefix includes a normal cyclic prefix, and where the subcarrier spacing used to generate the discovery preamble includes a second subcarrier spacing and the first cyclic prefix includes an extended cyclic prefix. In other cases, a length of the first cyclic prefix may be based on a frequency band in which the discovery preamble is received. In such cases, the frequency band in which the discovery preamble is received may include a first frequency band and the first cyclic prefix may include a normal cyclic prefix, and where the frequency band in which the discovery preamble is received includes a second frequency band and the first cyclic prefix includes an extended cyclic prefix. Discovery message manager 720 may receive the discovery message based on receiving at least the portion of the cyclically periodic signal.

Discovery preamble generator 725 may generate a discovery preamble to transmit prior to the discovery message, where the discovery preamble indicates an upcoming transmission of the discovery message. In some cases, generating the discovery preamble includes generating the discovery preamble using a subcarrier spacing that is less than a subcarrier spacing used for the discovery message.

Cyclic prefix manager 730 may apply a first cyclic prefix to the discovery preamble and a second cyclic prefix to the discovery message, where the first cyclic prefix is longer than the second cyclic prefix. In some cases, the first cyclic prefix associated with the discovery preamble includes an extended cyclic prefix and the second cyclic prefix associated with the discovery message includes a normal cyclic prefix. In some cases, the first cyclic prefix is longer than a maximum time offset for discovery preamble transmissions. In some cases, a length of the first cyclic prefix may be based on a subcarrier spacing used to generate the discovery preamble. In such cases, the subcarrier spacing used to generate the discovery preamble may include a first subcarrier spacing and the first cyclic prefix includes a normal cyclic prefix, and where the subcarrier spacing used to generate the discovery preamble includes a second subcarrier spacing and the first cyclic prefix includes an extended cyclic prefix. In other cases, a length of the first cyclic prefix may be based on a frequency band in which the one or more copies of the generated discovery preamble is transmitted. In such cases, the frequency band in which the one or more copies of the generated discovery preamble is transmitted may include a first frequency band and the first cyclic prefix includes a normal cyclic prefix, and where the frequency band in which the one or more copies of the generated discovery preamble is transmitted may include a second frequency band and the first cyclic prefix includes an extended cyclic prefix. Cyclic prefix manager 730 may append a cyclic prefix to the time domain waveform to generate the cyclically periodic signal including the set of copies of the discovery preamble. Cyclic prefix manager 730 may append a cyclic prefix to each time domain waveform of the set of time domain waveforms.

Discovery preamble manager 735 may receive a broadcast of a discovery preamble as part of a device discovery procedure, where the discovery preamble indicates an upcoming transmission of a discovery message, and where a first cyclic prefix associated with the discovery preamble is longer than a second cyclic prefix associated with the discovery message. In some cases, the first cyclic prefix associated with the discovery preamble includes an extended cyclic prefix and the second cyclic prefix associated with the discovery message includes a normal cyclic prefix. In some cases, the discovery preamble may be generated using a subcarrier spacing that is less than a subcarrier spacing used for the discovery message. Discovery preamble manager 735 may generate a cyclically periodic signal including a set of copies of a discovery preamble to transmit prior to the discovery message, where the discovery preamble indicates an upcoming transmission of the discovery message.

Discovery preamble manager 735 may receive at least a portion of a cyclically periodic signal including a set of copies of a discovery preamble, where the discovery preamble indicates an upcoming transmission of a discovery message. In some cases, the cyclically periodic signal includes a cyclic prefix appended to a time domain waveform including the set of copies of the discovery preamble. In other cases, the cyclically periodic signal includes a combination of time domain waveforms each corresponding to a different copy of the discovery preamble and each including an appended cyclic prefix.

Base sequence identifier 740 may identify a base sequence corresponding to the discovery preamble. Base sequence mapper 745 may determine a subcarrier spacing for mapping the base sequence to subcarriers in a frequency domain and map the base sequence to non-consecutive subcarriers in the frequency domain based on the subcarrier spacing, where a number of subcarriers between the non-consecutive subcarriers corresponds to a number of copies of the discovery preamble included in the cyclically periodic signal.

Waveform generator 750 may generate a time domain waveform including the set of copies of the discovery preamble based on a frequency-to-time-domain transform of the mapped base sequence. In some cases, generating the cyclically periodic signal includes generating a set of time domain waveforms each including a copy of the discovery preamble. Waveform shifter 755 may cyclically shift at least one of the set of time domain waveforms based on a length of a cyclic prefix to be appended to the at least one time domain waveform and a position of the at least one time domain waveform in the cyclically periodic signal. Waveform shifter 755 may cyclically shift the received portion of the cyclically periodic signal to identify the discovery preamble. Waveform combiner 760 may combine the set of time domain waveforms to generate the cyclically periodic signal.

Figure 8:
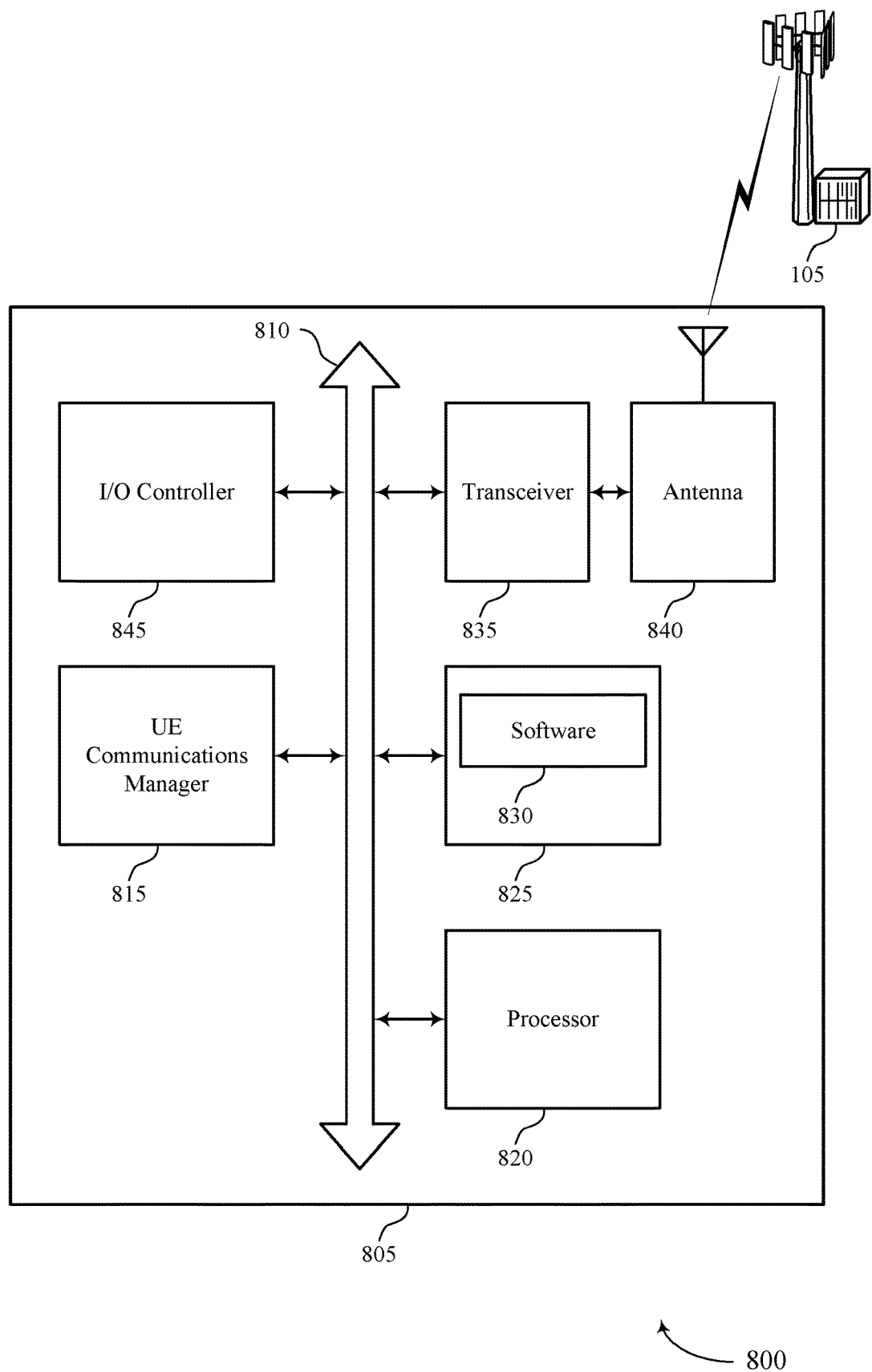
FIG. 8 illustrates a block diagram of a system including a user equipment (UE) that supports waveform design of discovery signals in accordance with aspects of the present disclosure.

FIG. 8 shows a diagram of a system 800 including a device 805 that supports waveform design of discovery signals in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting waveform design of discovery signals).

Memory 825 may include random access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support waveform design of discovery signals. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
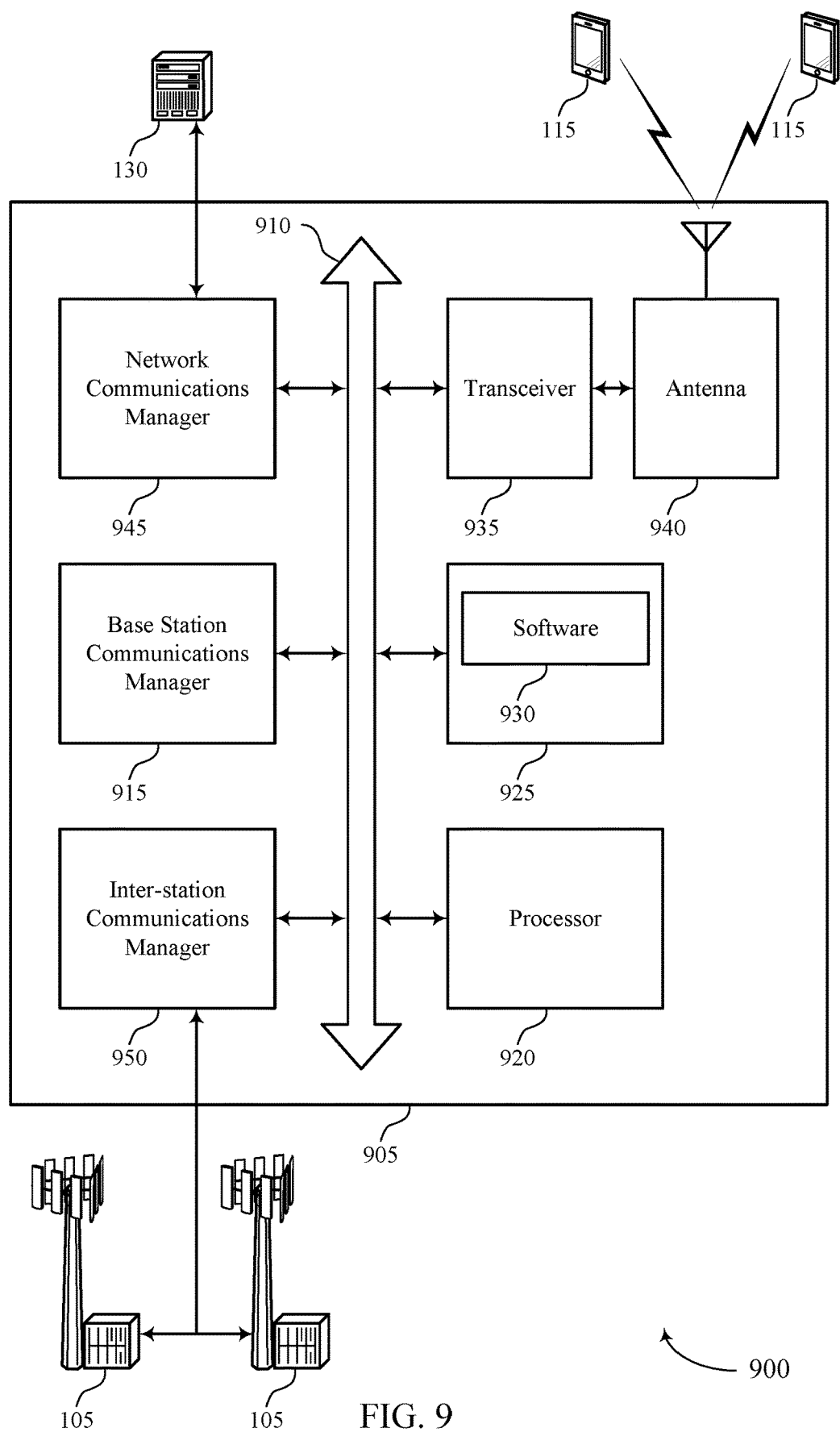
FIG. 9 illustrates a block diagram of a system including a base station that supports waveform design of discovery signals in accordance with aspects of the present disclosure.

FIG. 9 shows a diagram of a system 900 including a device 905 that supports waveform design of discovery signals in accordance with aspects of the present disclosure. Device 905 may be an example of or include the components of wireless device 505, wireless device 605, or a base station 105 as described above, e.g., with reference to FIGS. 5 and 6. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting waveform design of discovery signals).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware or software operation such as the interaction with peripheral components or devices.

Software 930 may include code to implement aspects of the present disclosure, including code to support waveform design of discovery signals. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
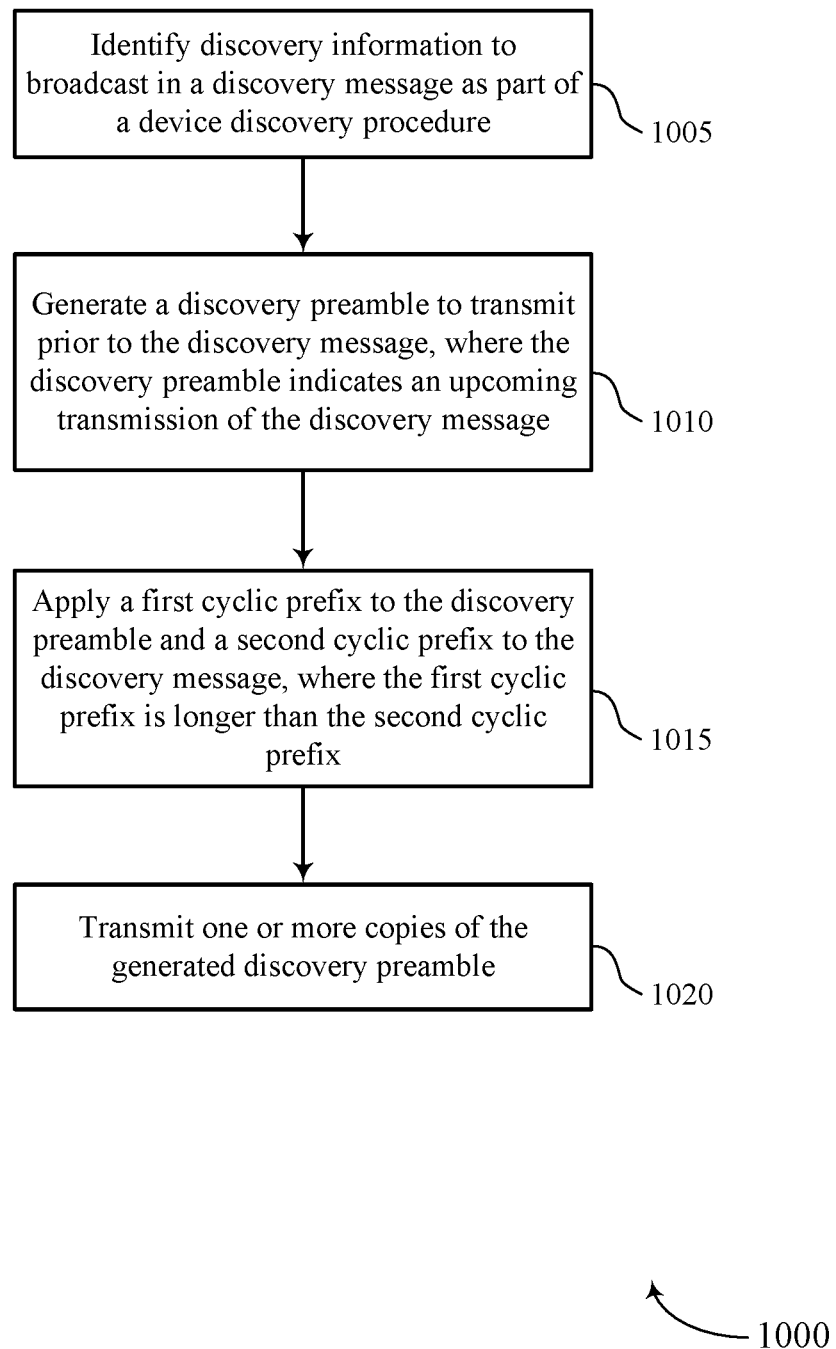
FIGS. 10 through 13 illustrate methods for waveform design of discovery signals in accordance with aspects of the present disclosure.

FIG. 10 shows a flowchart illustrating a method 1000 for waveform design of discovery signals in accordance with aspects of the present disclosure. The operations of method 1000 may be implemented by a UE 115 or base station 105 or its components as described herein. For example, the operations of method 1000 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1005 the UE 115 or base station 105 may identify discovery information to broadcast in a discovery message as part of a device discovery procedure. The operations of 1005 may be performed according to the methods described herein. In certain examples, aspects of the operations of 1005 may be performed by a discovery message manager as described with reference to FIGS. 5 through 7.

At 1010 the UE 115 or base station 105 may generate a discovery preamble to transmit prior to the discovery message, where the discovery preamble indicates an upcoming transmission of the discovery message. The operations of 1010 may be performed according to the methods described herein. In some examples, aspects of the operations of 1010 may be performed by a discovery preamble generator as described with reference to FIGS. 5 through 7.

At 1015 the UE 115 or base station 105 may apply a first cyclic prefix to the discovery preamble and a second cyclic prefix to the discovery message, where the first cyclic prefix is longer than the second cyclic prefix. The operations of 1015 may be performed according to the methods described herein. In some examples, aspects of the operations of 1015 may be performed by a cyclic prefix manager as described with reference to FIGS. 5 through 7.

At 1020 the UE 115 or base station 105 may transmit one or more copies of the generated discovery preamble. The operations of 1020 may be performed according to the methods described herein. In some examples, aspects of the operations of 1020 may be performed by a transmitter as described with reference to FIGS. 5 through 7.

Figure 11:
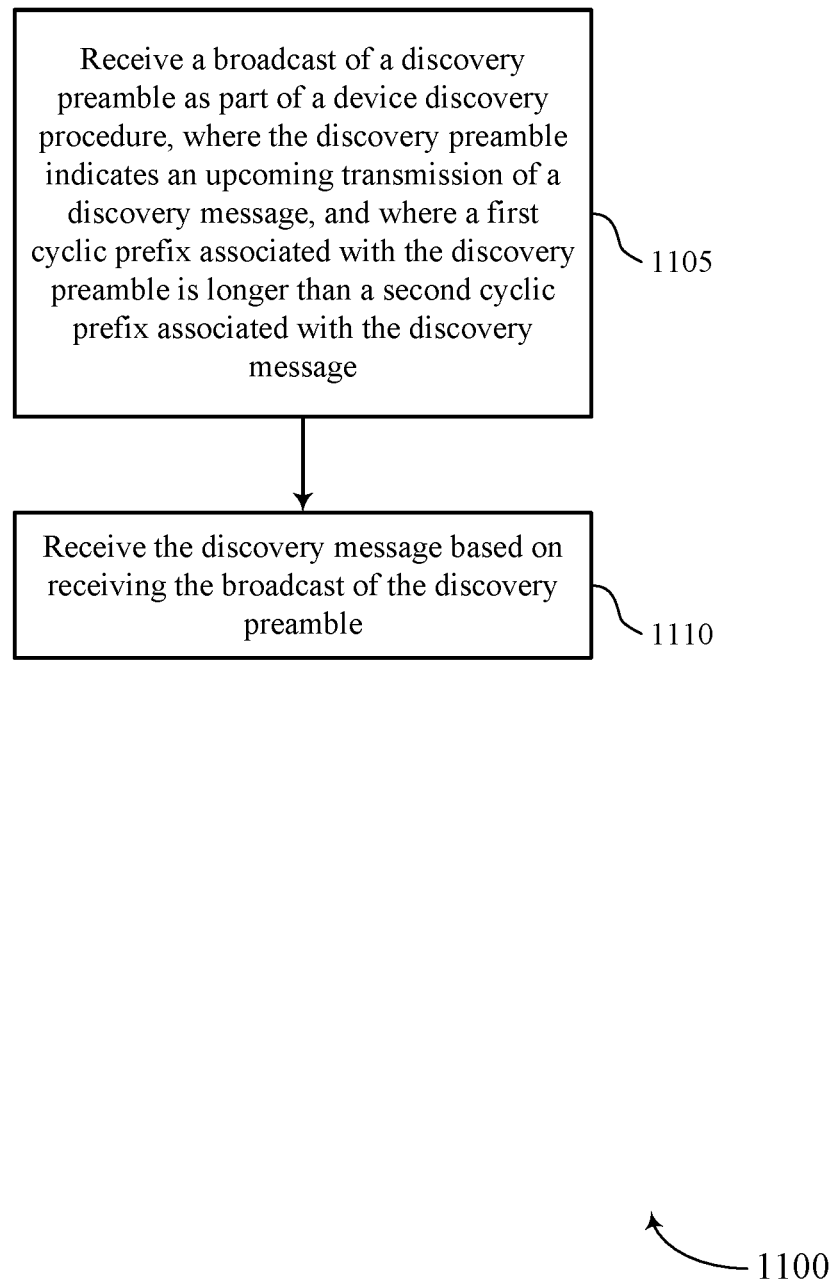

FIG. 11 shows a flowchart illustrating a method 1100 for waveform design of discovery signals in accordance with aspects of the present disclosure. The operations of method 1100 may be implemented by a UE 115 or base station 105 or its components as described herein. For example, the operations of method 1100 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105 the UE 115 or base station 105 may receive a broadcast of a discovery preamble as part of a device discovery procedure, where the discovery preamble indicates an upcoming transmission of a discovery message, and where a first cyclic prefix associated with the discovery preamble is longer than a second cyclic prefix associated with the discovery message. The operations of 1105 may be performed according to the methods described herein. In some examples, aspects of the operations of 1105 may be performed by a discovery preamble manager as described with reference to FIGS. 5 through 7.

At 1110 the UE 115 or base station 105 may receive the discovery message based at least in part on receiving the broadcast of the discovery preamble. The operations of 1110 may be performed according to the methods described herein. In some examples, aspects of the operations of 1110 may be performed by a discovery message manager as described with reference to FIGS. 5 through 7.

Figure 12:
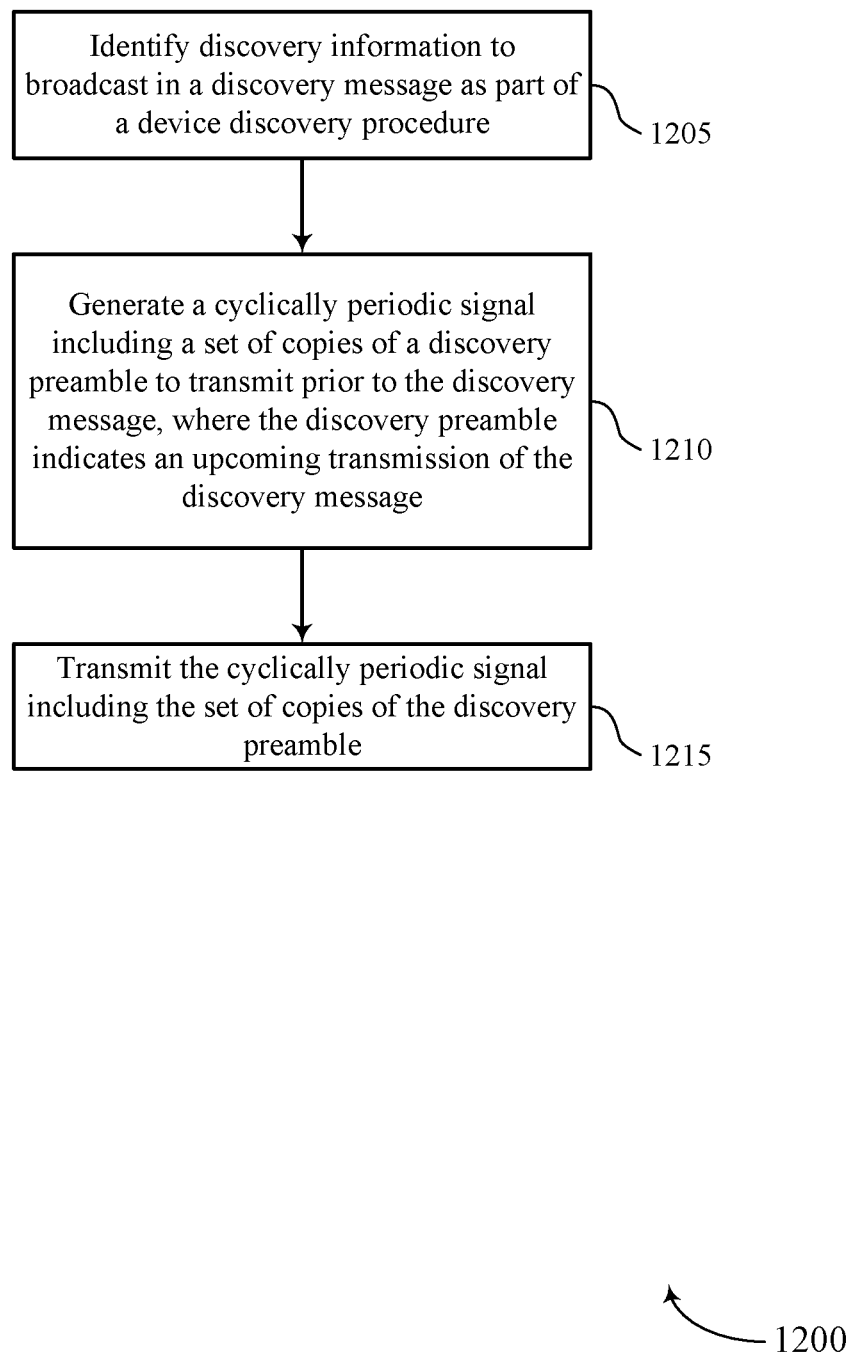

FIG. 12 shows a flowchart illustrating a method 1200 for waveform design of discovery signals in accordance with aspects of the present disclosure. The operations of method 1200 may be implemented by a UE 115 or base station 105 or its components as described herein. For example, the operations of method 1200 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may identify discovery information to broadcast in a discovery message as part of a device discovery procedure. The operations of 1205 may be performed according to the methods described herein. In some examples, aspects of the operations of 1205 may be performed by a discovery message manager as described with reference to FIGS. 5 through 7.

At 1210 the UE 115 or base station 105 may generate a cyclically periodic signal comprising a plurality of copies of a discovery preamble to transmit prior to the discovery message, where the discovery preamble indicates an upcoming transmission of the discovery message. The operations of 1210 may be performed according to the methods described herein. In some examples, aspects of the operations of 1210 may be performed by a discovery preamble manager as described with reference to FIGS. 5 through 7.

At 1215 the UE 115 or base station 105 may transmit the cyclically periodic signal comprising the plurality of copies of the discovery preamble. The operations of 1215 may be performed according to the methods described herein. In some examples, aspects of the operations of 1215 may be performed by a transmitter as described with reference to FIGS. 5 through 7.

Figure 13:
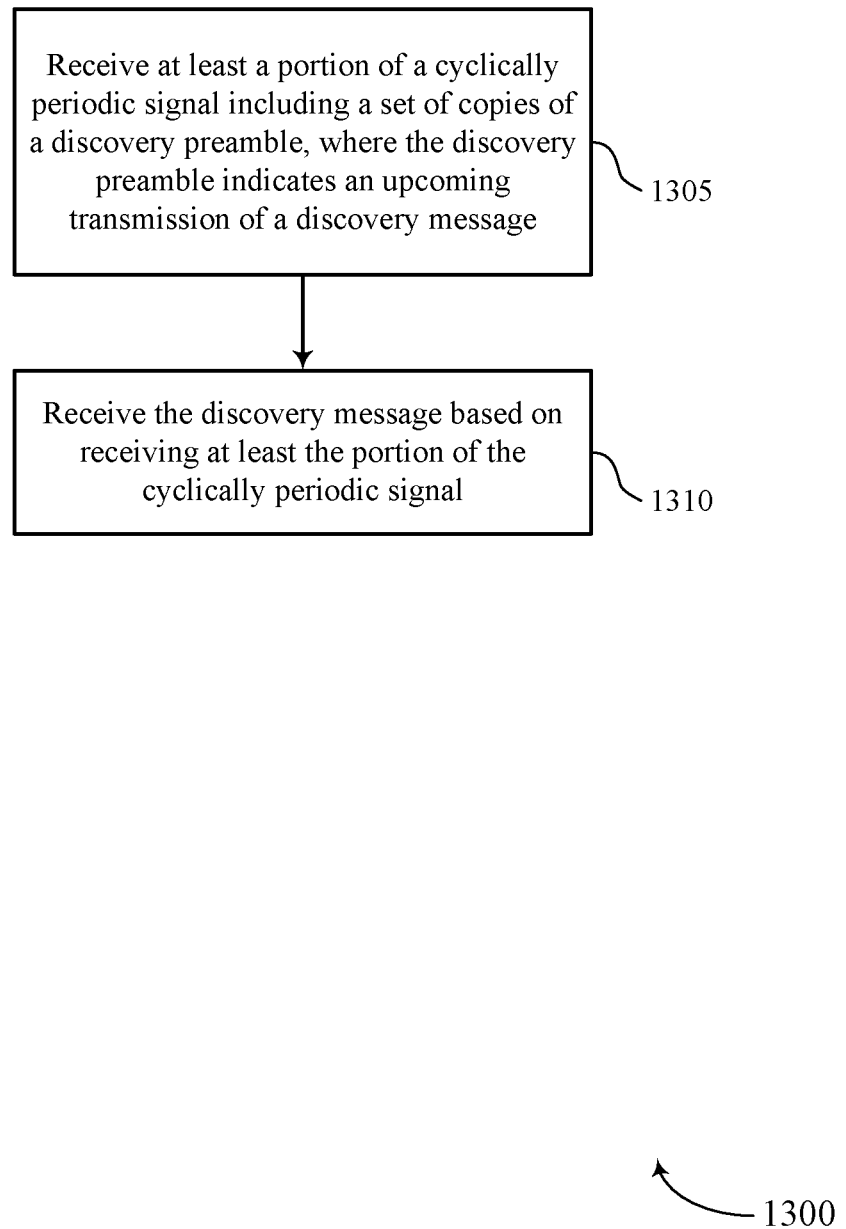

FIG. 13 shows a flowchart illustrating a method 1300 for waveform design of discovery signals in accordance with aspects of the present disclosure. The operations of method 1300 may be implemented by a UE 115 or base station 105 or its components as described herein. For example, the operations of method 1300 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may receive at least a portion of a cyclically periodic signal comprising a plurality of copies of a discovery preamble, where the discovery preamble indicates an upcoming transmission of a discovery message. The operations of 1305 may be performed according to the methods described herein. In some examples, aspects of the operations of 1305 may be performed by a discovery preamble manager as described with reference to FIGS. 5 through 7.

At 1310 the UE 115 or base station 105 may receive the discovery message based at least in part on receiving at least the portion of the cyclically periodic signal. The operations of 1310 may be performed according to the methods described herein. In some examples, aspects of the operations of 1310 may be performed by a discovery message manager as described with reference to FIGS. 5 through 7.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method for wireless communication that includes identifying discovery information to broadcast in a discovery message as part of a device discovery procedure, generating a discovery preamble to transmit prior to the discovery message, where the discovery preamble indicates an upcoming transmission of the discovery message, applying a first cyclic prefix to the discovery preamble and a second cyclic prefix to the discovery message, where the first cyclic prefix is longer than the second cyclic prefix, and transmitting one or more copies of the generated discovery preamble.

In Example 2, the method of Example 1 further includes where the first cyclic prefix associated with the discovery preamble includes an extended cyclic prefix and the second cyclic prefix associated with the discovery message includes a normal cyclic prefix.

In Example 3, the method of any of Examples 1-2 further includes generating the discovery preamble using a subcarrier spacing that is less than a subcarrier spacing used for the discovery message.

In Example 4, the method of any of Examples 1-3 further includes where the first cyclic prefix is longer than a maximum time offset for discovery preamble transmissions.

In Example 5, the method of any of Examples 1-4 further includes where the length of the first cyclic prefix is based on a subcarrier spacing used to generate the discovery preamble.

In Example 6, the method of any of Examples 1-5 further includes where the subcarrier spacing used to generate the discovery preamble includes a first subcarrier spacing and the first cyclic prefix includes a normal cyclic prefix.

In Example 7, the method of any of Examples 1-6 further includes where the subcarrier spacing used to generate the discovery preamble includes a second subcarrier spacing and the first cyclic prefix includes an extended cyclic prefix.

In Example 8, the method of any of Examples 1-7 further includes where a length of the first cyclic prefix is based on a frequency band in which the one or more copies of the generated discovery preamble is transmitted.

In Example 9, the method of any of Examples 1-8 further includes where the frequency band in which the one or more copies of the generated discovery preamble is transmitted includes a first frequency band and the first cyclic prefix includes a normal cyclic prefix.

In Example 10, the method of any of Examples 1-9 further includes where the frequency band in which the one or more copies of the generated discovery preamble is transmitted includes a second frequency band and the first cyclic prefix includes an extended cyclic prefix.

Example 11 is a method for wireless communication that includes receiving a broadcast of a discovery preamble as part of a device discovery procedure, where the discovery preamble indicates an upcoming transmission of a discovery message, and where a first cyclic prefix associated with the discovery preamble is longer than a second cyclic prefix associated with the discovery message, and receiving the discovery message based on receiving the broadcast of the discovery preamble.

In Example 12, the method of Example 11 further includes where the first cyclic prefix associated with the discovery preamble includes an extended cyclic prefix and the second cyclic prefix associated with the discovery message includes a normal cyclic prefix.

In Example 13, the method of any of Examples 11-12 further includes where the discovery preamble is generated using a subcarrier spacing that is less than a subcarrier spacing used for the discovery message.

In Example 14, the method of any of Examples 11-13 further includes where the first cyclic prefix is longer than a maximum time offset for discovery preamble transmissions.

In Example 15, the method of any of Examples 11-14 further includes where a length of the first cyclic prefix is based on a subcarrier spacing used to generate the discovery preamble.

In Example 16, the method of any of Examples 11-15 further includes where the subcarrier spacing used to generate the discovery preamble includes a first subcarrier spacing and the first cyclic prefix includes a normal cyclic prefix.

In Example 17, the method of any of Examples 11-16 further includes where the subcarrier spacing used to generate the discovery preamble includes a second subcarrier spacing and the first cyclic prefix includes an extended cyclic prefix.

In Example 18, the method of any of Examples 11-17 further includes where a length of the first cyclic prefix is based on a frequency band in which the discovery preamble is received.

In Example 19, the method of any of Examples 11-18 further includes where the frequency band in which the discovery preamble is received includes a first frequency band and the first cyclic prefix includes a normal cyclic prefix.

In Example 20, the method of any of Examples 11-19 further includes where the frequency band in which the discovery preamble is received includes a second frequency band and the first cyclic prefix includes an extended cyclic prefix.

Example 21 is a method for wireless communication that includes identifying discovery information to broadcast in a discovery message as part of a device discovery procedure, generating a cyclically periodic signal comprising a plurality of copies of a discovery preamble to transmit prior to the discovery message, where the discovery preamble indicates an upcoming transmission of the discovery message, and transmitting the cyclically periodic signal comprising the plurality of copies of the discovery preamble.

In Example 22, the method of Example 21 further includes identifying a base sequence corresponding to the discovery preamble, determining a subcarrier spacing for mapping the base sequence to subcarriers in a frequency domain, mapping the base sequence to non-consecutive subcarriers in the frequency domain based on the subcarrier spacing, where a number of subcarriers between the non-consecutive subcarriers corresponds to a number of copies of the discovery preamble included in the cyclically periodic signal, generating a time domain waveform comprising the plurality of copies of the discovery preamble based on a frequency-to-time-domain transform of the mapped base sequence, and appending a cyclic prefix to the time domain waveform to generate the cyclically periodic signal comprising the plurality of copies of the discovery preamble.

In Example 23, the method of any of Examples 21-22 further includes generating a plurality of time domain waveforms each comprising a copy of the discovery preamble, cyclically shifting at least one of the plurality of time domain waveforms based on a length of a cyclic prefix to be appended to the at least one time domain waveform and a position of the at least one time domain waveform in the cyclically periodic signal, appending a cyclic prefix to each time domain waveform of the plurality of time domain waveforms, and combining the plurality of time domain waveforms to generate the cyclically periodic signal.

Example 24 is a method for wireless communication that includes receiving at least a portion of a cyclically periodic signal comprising a plurality of copies of a discovery preamble, where the discovery preamble indicates an upcoming transmission of a discovery message, and receiving the discovery message based on receiving at least the portion of the cyclically periodic signal, where the plurality of copies of the discovery preamble indicate an upcoming transmission of the discovery message.

In Example 25, the method of Example 24 further includes cyclically shifting the received portion of the cyclically periodic signal to identify the discovery preamble.

In Example 26, the method of any of Examples 24-25 further includes where the cyclically periodic signal includes a cyclic prefix appended to a time domain waveform comprising the plurality of copies of the discovery preamble.

In Example 27, the method of any of Examples 24-26 further includes where the cyclically periodic signal includes a combination of time domain waveforms each corresponding to a different copy of the discovery preamble and each comprising an appended cyclic prefix.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying discovery information to broadcast in a discovery message as part of a device discovery procedure;
generating a discovery preamble indicating an upcoming transmission of the discovery message, wherein the discovery preamble has a first cyclic prefix with a first length and the discovery message has a second cyclic prefix with a second length, the first length being longer than the second length based at least in part on a frequency band associated with the discovery preamble satisfying a threshold frequency, and the first length determined based at least in part on being longer than a maximum time offset for discovery preamble transmissions; and
transmitting one or more copies of the generated discovery preamble prior to transmission of the discovery message.

2. The method of claim 1, wherein generating the discovery preamble comprises:
generating the discovery preamble using a first subcarrier spacing associated with the discovery preamble, the first subcarrier spacing less than a second subcarrier spacing associated with the discovery message.

3. The method of claim 1, wherein the first length of the first cyclic prefix is based at least in part on a subcarrier spacing used to generate the discovery preamble.

4. The method of claim 3, wherein the subcarrier spacing used to generate the discovery preamble comprises a first subcarrier spacing and the first cyclic prefix comprises a normal cyclic prefix.

5. The method of claim 3, wherein the subcarrier spacing used to generate the discovery preamble comprises a second subcarrier spacing and the first cyclic prefix comprises an extended cyclic prefix.

6. The method of claim 1, wherein the first length of the first cyclic prefix is based at least in part on a frequency band in which the one or more copies of the generated discovery preamble is transmitted.

7. The method of claim 6, wherein the frequency band in which the one or more copies of the generated discovery preamble is transmitted comprises a first frequency band and the first cyclic prefix comprises a normal cyclic prefix.

8. The method of claim 6, wherein the frequency band in which the one or more copies of the generated discovery preamble is transmitted comprises a second frequency band and the first cyclic prefix comprises an extended cyclic prefix.

9. A method for wireless communication, comprising:
receiving, as part of a device discovery procedure, a broadcast of a discovery preamble indicating an upcoming transmission of a discovery message, wherein the discovery preamble has a first cyclic prefix with a first length and the discovery message has a second cyclic prefix with a second length, the first length being longer than the second length based at least in part on a frequency band associated with the discovery preamble satisfying a threshold frequency, and the first length being longer than a maximum time offset for discovery preamble transmissions; and
receiving the discovery message based at least in part on receiving the broadcast of the discovery preamble.

10. The method of claim 9, wherein the discovery preamble is generated using a first subcarrier spacing associated with the discovery preamble, the first subcarrier spacing less than a second subcarrier spacing associated with the discovery message.

11. The method of claim 9, wherein the first length of the first cyclic prefix is based at least in part on a subcarrier spacing used to generate the discovery preamble.

12. The method of claim 11, wherein the subcarrier spacing used to generate the discovery preamble comprises a first subcarrier spacing and the first cyclic prefix comprises a normal cyclic prefix.

13. The method of claim 11, wherein the subcarrier spacing used to generate the discovery preamble comprises a second subcarrier spacing and the first cyclic prefix comprises an extended cyclic prefix.

14. The method of claim 9, wherein the first length of the first cyclic prefix is based at least in part on a frequency band in which the discovery preamble is received.

15. The method of claim 14, wherein the frequency band in which the discovery preamble is received comprises a first frequency band and the first cyclic prefix comprises a normal cyclic prefix.

16. The method of claim 14, wherein the frequency band in which the discovery preamble is received comprises a second frequency band and the first cyclic prefix comprises an extended cyclic prefix.

17. A method for wireless communication, comprising:
identifying discovery information to broadcast in a discovery message for discovery of a device as part of a device discovery procedure;
generating a cyclically periodic signal comprising a plurality of copies of a discovery preamble for discovery of the device, each copy of the plurality of copies indicating a transmission of the discovery message that occurs after transmission of the plurality of copies of the discovery preamble; and
transmitting, prior to transmission of the discovery message, the cyclically periodic signal comprising the plurality of copies of the discovery preamble.

18. The method of claim 17, wherein generating the cyclically periodic signal comprises:
identifying a base sequence corresponding to the discovery preamble;
determining a subcarrier spacing for mapping the base sequence to subcarriers in a frequency domain;

mapping the base sequence to non-consecutive subcarriers in the frequency domain based at least in part on the subcarrier spacing, wherein a number of subcarriers between the non-consecutive subcarriers corresponds to a number of copies of the discovery preamble included in the cyclically periodic signal;

generating a time domain waveform comprising the plurality of copies of the discovery preamble based at least in part on a frequency-to-time-domain transform of the mapped base sequence; and appending a cyclic prefix to the time domain waveform to generate the cyclically periodic signal comprising the plurality of copies of the discovery preamble.

19. The method of claim 17, wherein generating the cyclically periodic signal comprises:

generating a plurality of time domain waveforms each comprising a copy of the discovery preamble;

cyclically shifting at least one time domain waveform of the plurality of time domain waveforms based at least in part on a length of a cyclic prefix to be appended to the at least one time domain waveform and a position of the at least one time domain waveform in the cyclically periodic signal;

appending a cyclic prefix to each time domain waveform of the plurality of time domain waveforms; and combining the plurality of time domain waveforms to generate the cyclically periodic signal.

20. A method for wireless communication, comprising:

receiving at least a portion of a cyclically periodic signal comprising a plurality of copies of a discovery preamble for discovery of a device, each copy of the plurality of copies indicating a transmission of a discovery message that occurs after transmission of the plurality of copies of the discovery preamble; and receiving the discovery message based at least in part on receiving at least the portion of the cyclically periodic signal, wherein the plurality of copies of the discovery preamble for discovery of the device indicate the transmission of the discovery message.

21. The method of claim 20, further comprising:

cyclically shifting the received at least the portion of the cyclically periodic signal to identify the discovery preamble.

22. The method of claim 20, wherein the cyclically periodic signal comprises a cyclic prefix appended to a time domain waveform comprising the plurality of copies of the discovery preamble.

23. The method of claim 20, wherein the cyclically periodic signal comprises a combination of time domain waveforms each corresponding to a different copy of the discovery preamble and each comprising an appended cyclic prefix.

24. The method of claim 1, wherein the first cyclic prefix associated with the discovery preamble comprises an extended cyclic prefix and the second cyclic prefix associated with the discovery message comprises a normal cyclic prefix.

25. The method of claim 9, wherein the first cyclic prefix associated with the discovery preamble comprises an extended cyclic prefix and the second cyclic prefix associated with the discovery message comprises a normal cyclic prefix.

* * * * *